US009878676B2

(12) United States Patent
Taylor

(10) Patent No.: US 9,878,676 B2
(45) Date of Patent: Jan. 30, 2018

(54) LIFT STORAGE DEVICE FOR A VEHICLE

(71) Applicant: David Ralph Taylor, Princeton, IL (US)

(72) Inventor: David Ralph Taylor, Princeton, IL (US)

( * ) Notice: Subject to any disclaimer, the term of this patent is extended or adjusted under 35 U.S.C. 154(b) by 11 days.

(21) Appl. No.: 15/183,977

(22) Filed: Jun. 16, 2016

(65) Prior Publication Data

US 2016/0368542 A1  Dec. 22, 2016

Related U.S. Application Data

(60) Provisional application No. 62/180,952, filed on Jun. 17, 2015.

(51) Int. Cl.
| | |
|---|---|
| *B60R 9/06* | (2006.01) |
| *B60R 11/06* | (2006.01) |
| *B66F 7/06* | (2006.01) |
| *B66F 7/08* | (2006.01) |
| *B66F 7/28* | (2006.01) |
| *B60R 11/00* | (2006.01) |

(52) U.S. Cl.
CPC ............ *B60R 9/065* (2013.01); *B66F 7/0666* (2013.01); *B66F 7/08* (2013.01); *B66F 7/28* (2013.01); *B60R 11/06* (2013.01); *B60R 2011/008* (2013.01); *B60R 2011/0092* (2013.01)

(58) Field of Classification Search
CPC ... B60R 11/06; B60R 9/065; B60R 2011/008; B60R 2011/0092; B66F 7/065
USPC ...................... 224/404; 296/37.6; D12/414.1
See application file for complete search history.

(56) References Cited

U.S. PATENT DOCUMENTS

| | | | |
|---|---|---|---|
| 2,629,644 A * | 2/1953 | Heys ...................... | A01K 97/06 312/249.11 |
| 4,328,989 A | 5/1982 | Childers | |
| D305,315 S * | 1/1990 | Fletcher ................... | D12/414.1 |
| 4,917,430 A * | 4/1990 | Lawrence ................. | B60R 7/04 224/281 |
| 4,936,624 A | 6/1990 | West | |
| 5,016,858 A | 5/1991 | Mitchell | |
| 5,303,969 A | 4/1994 | Simnacher | |
| D353,046 S * | 12/1994 | Whitaker .................. | D12/414.1 |
| 5,634,577 A * | 6/1997 | Pearson, Jr. ............ | B60R 11/06 224/242 |
| 6,155,770 A | 12/2000 | Warhurst et al. | |
| 6,467,830 B1 | 10/2002 | Cortright | |
| 6,626,479 B1 | 9/2003 | Skoug | |
| 6,695,375 B1 * | 2/2004 | May .......................... | B60R 9/00 224/281 |
| D488,428 S * | 4/2004 | Greene ..................... | D12/414.1 |
| 6,929,303 B1 | 8/2005 | Sharples | |
| 7,052,066 B2 | 5/2006 | Emery et al. | |

(Continued)

*Primary Examiner* — Justin Larson
(74) *Attorney, Agent, or Firm* — Erickson Law Group, PC

(57) ABSTRACT

A storage device for a vehicle is disclosed. In one embodiment, the storage device has an exterior housing, an interior container, and a scissor lift mechanism. The scissor lift mechanism is located within the exterior housing and is operatively connected to the interior container. The scissor lift mechanism has a raised position and a lowered position. The interior container is within the exterior housing when the scissor lift mechanism is in the lowered position. The interior container is at least partially located outside the exterior housing when the scissor lift mechanism is in the raised position.

19 Claims, 19 Drawing Sheets

(56) References Cited

U.S. PATENT DOCUMENTS

| | | | |
|---|---|---|---|
| 7,182,177 B1 | 2/2007 | Simnacher | |
| 7,249,771 B1 * | 7/2007 | Brennan | A47J 37/0704 |
| | | | 280/35 |
| 7,354,089 B2 | 4/2008 | Hobrecht | |
| 8,007,024 B2 | 8/2011 | Kealy | |
| 8,038,195 B1 * | 10/2011 | Hutcheson | B60R 9/00 |
| | | | 296/136.04 |
| 8,162,190 B2 * | 4/2012 | Hanson | B60R 9/00 |
| | | | 224/404 |
| 8,393,665 B2 | 3/2013 | Villano et al. | |
| 8,636,182 B1 | 1/2014 | Gordon | |
| 9,481,403 B1 * | 11/2016 | Johnson | B62D 33/023 |
| 2004/0207226 A1 | 10/2004 | Johnson | |
| 2008/0191506 A1 * | 8/2008 | Huotari | B60R 9/00 |
| | | | 296/37.6 |
| 2009/0127306 A1 | 5/2009 | Mins | |
| 2009/0189403 A1 | 7/2009 | Voglmayr | |
| 2010/0051662 A1 | 3/2010 | Hanson et al. | |
| 2011/0037286 A1 * | 2/2011 | Nebel | B60R 9/00 |
| | | | 296/37.6 |
| 2011/0284602 A1 | 11/2011 | Lamouroux | |
| 2012/0187013 A1 * | 7/2012 | Gapinski | B25H 3/021 |
| | | | 206/373 |
| 2012/0200106 A1 * | 8/2012 | Villano | B60R 11/06 |
| | | | 296/37.6 |
| 2014/0231477 A1 * | 8/2014 | Perkins | B60R 11/06 |
| | | | 224/404 |
| 2016/0368542 A1 * | 12/2016 | Taylor | B60R 9/065 |

* cited by examiner

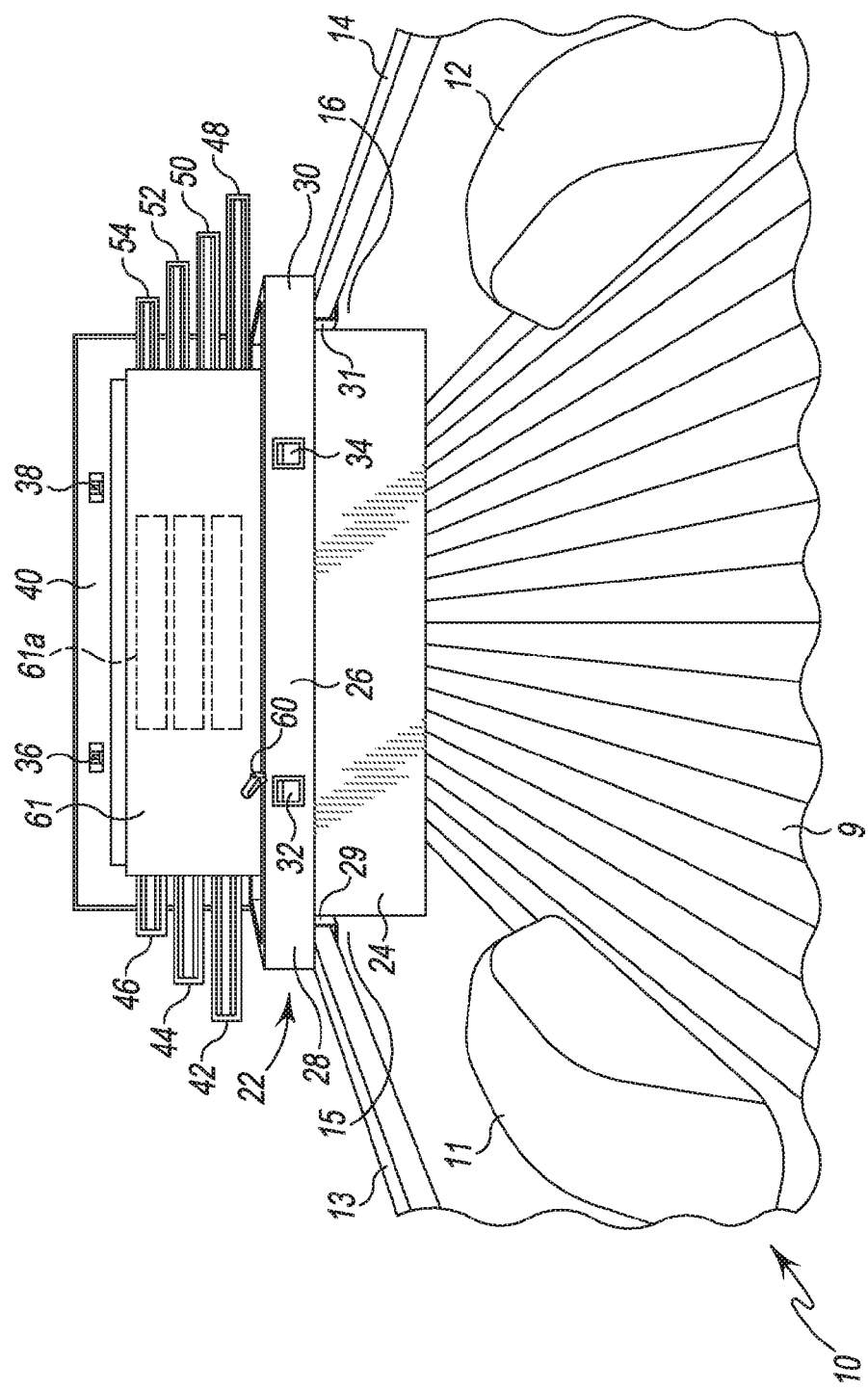

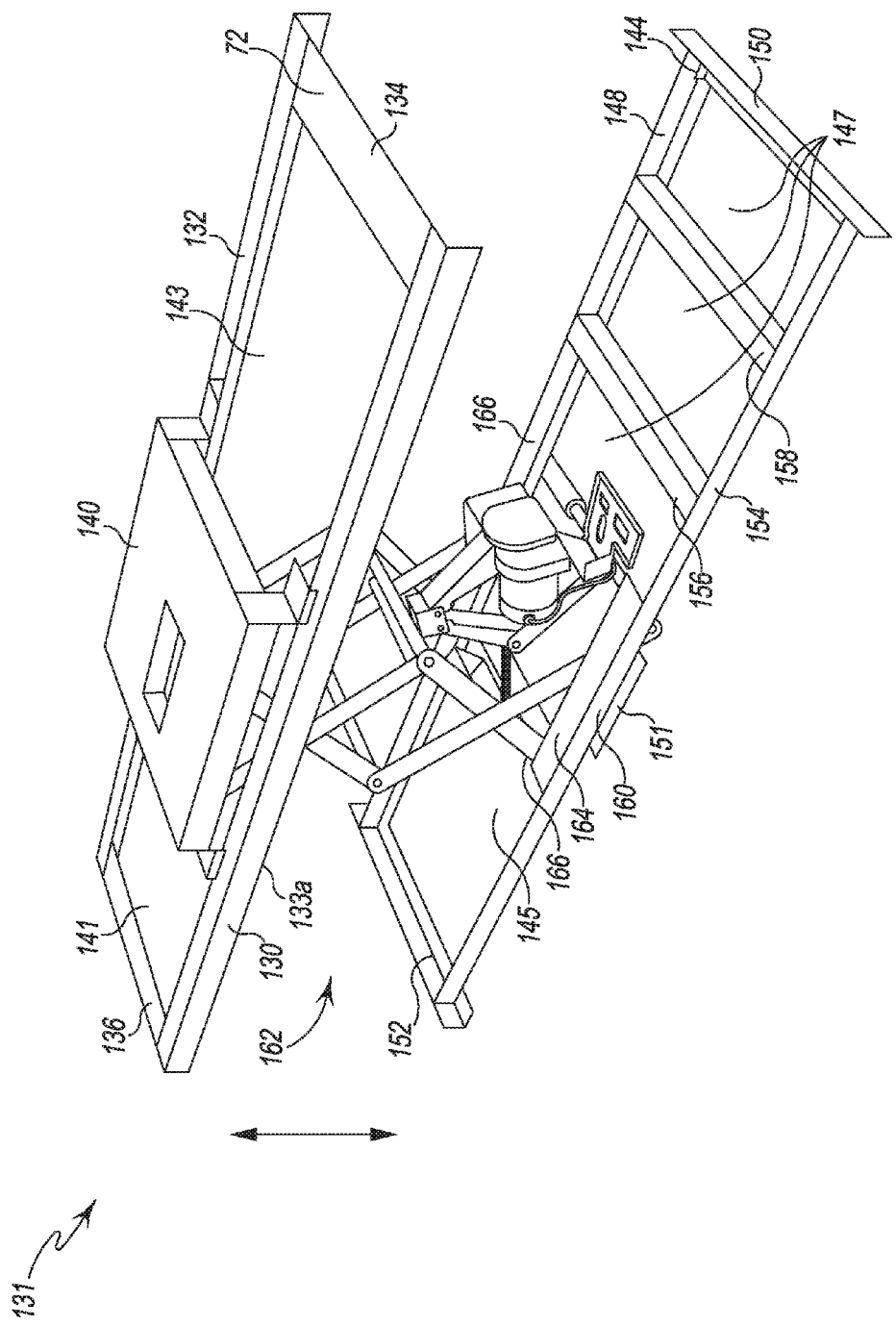

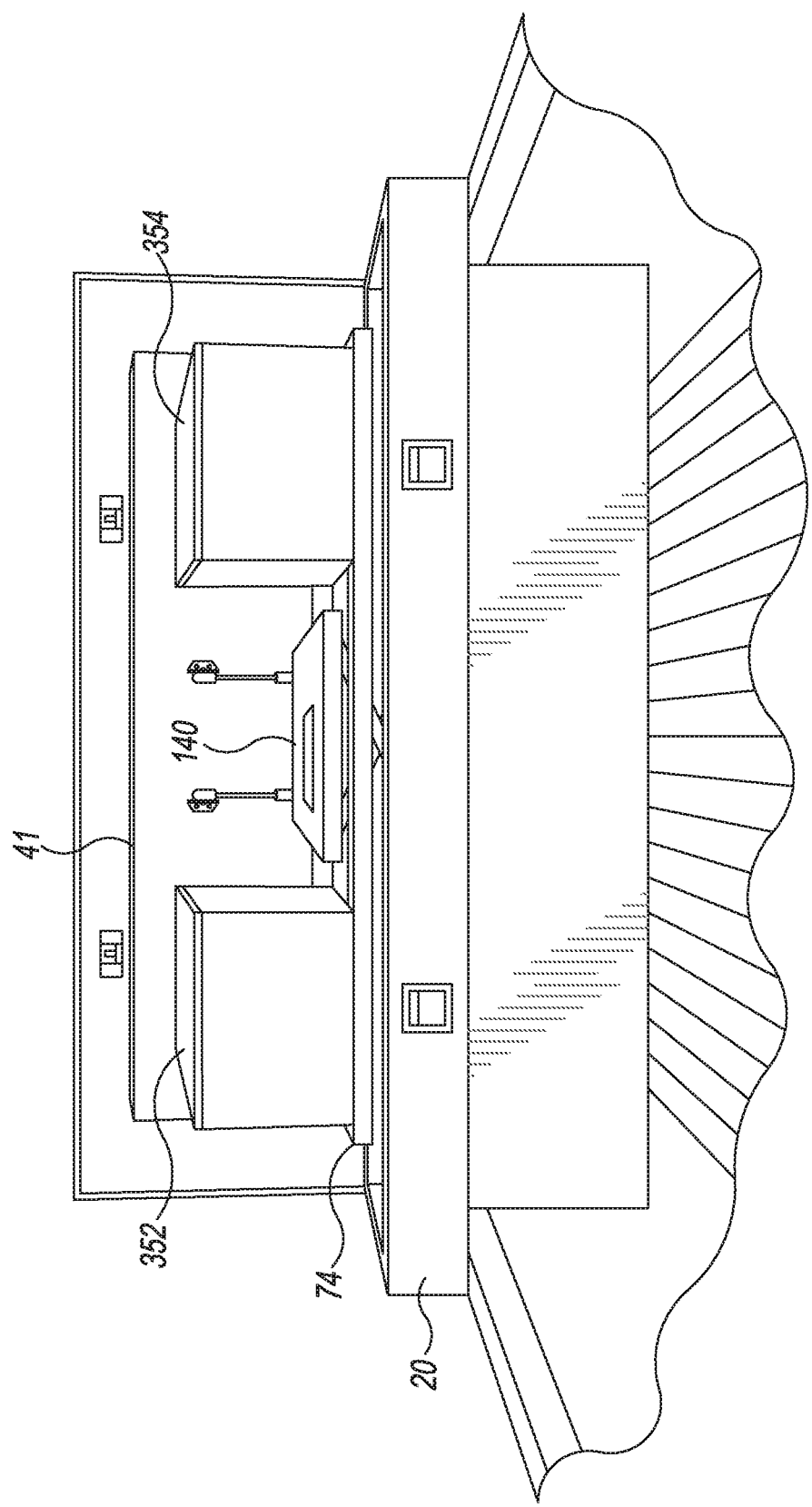

LIFT STORAGE DEVICE FOR A VEHICLE

This application claims the benefit of U.S. Patent Application No. 62/180,952, filed on Jun. 17, 2015, which is herein incorporated by reference.

FIELD OF THE INVENTION

This invention relates in general to vehicle storage devices.

BACKGROUND OF THE INVENTION

Pickup trucks comprise a cab and a bed. The bed may comprise raised sides with an open top. It is known to provide tool boxes for use in a bed of a pickup truck.

Many tool boxes for use in the bed of a pickup truck require the user to bend down to reach down in the tool box to retrieve items from the tool box. While the storage of tools within the tool box in the bed of a pickup truck may be convenient for transport, tools may not be conveniently located for easy removal from or storage within the tool box.

U.S. Pat. No. 5,303,969 (the '969 patent) and U.S. Pat. No. 7,182,177 (the '177 patent) disclose a tool box for locating over a wheel well of a truck bed. A jack is provided to move the tool box between a raised and a lowered position. However, the devices of the '969 patent and the '177 patent do not provide a housing that protects the jack from the environment and from materials that may be loaded into the bed of the truck.

U.S. Pat. No. 6,626,479 (the '479 patent) discloses a tool box that extends across the bed of a truck. A jack is provided to move the tool box from a lowered position to a raised position. However, the device of the '479 patent does not provide a housing that protects the jack components from the environment and from materials that may be loaded into the bed of the truck. Further, the device of the '479 patent provides long tubes for housing a portion of the lift mechanism and the tubes interrupt long vertical spaces of the container.

U.S. Patent App. Pub. No. 2011/0284602 (the '602 publication) discloses a tool box for a bed of a truck. Jacks raise and lower the tool box. However, the device of the '602 publication does not provide a housing that protects the jack components from the environment and from materials that may be loaded into the bed of the truck.

The devices of U.S. Pat. Nos. 8,636,182 and 6,929,303 do not provide a housing that protects the jack components from the environment and from materials that may be loaded into the bed of the truck.

U.S. Patent App. Pub. 2010/0051662 and U.S. Pat. No. 4,936,624 disclose truck tool boxes having a raisable portion. However, the raisable portions do not raise completely out of the tool box nor do they raise in a level manner. Each of these devices comprise a tilting lift mechanism, which has the disadvantage of causing the contents to slide to the back of the raisable portion away from the user. This makes it hard to maintain organization within the raisable portion and more difficult for the user to reach the desired items in the raisable portion.

The present inventor recognized the need for an improved lifting container for a vehicle.

The present inventor recognized the need for a lifting container that allows the user to deposit and remove items from a position more convenient for the user. The present inventor recognized the need for a lifting container that provides a housing for the lift mechanism to protect the mechanism from the environment and contents that may be loaded into the bed of the truck. The present inventor recognized the need for a lifting container that lifts vertically from an exterior housing so that the contents in the lifting container are not shuffled by tilting.

SUMMARY OF THE INVENTION

A lift storage device for a truck bed is disclosed. In one embodiment, the device comprises an exterior housing, an interior container, and a scissor lift mechanism.

The exterior housing comprises sidewalls, a lid, a left wing, and a right wing. The left wing is configured to rest on a left side rail of the truck bed and the right wing is configured to rest on the right side rail of the truck bed so that the exterior housing extends across the truck bed.

The scissor lift mechanism is located within the exterior housing and is operatively connected to the interior container. The scissor lift mechanism comprises a raised position and a lowered position. The interior container is within the exterior housing when the scissor lift mechanism is in the lowered position. The interior container is at least partially located outside the exterior housing when the scissor lift mechanism is in the raised position. The scissor lift mechanism maintains the interior container in the same orientation when the scissor lift mechanism is in the raised position and when the scissor lift mechanism is in the lowered position.

A drive mechanism is operatively connected to the scissor lift mechanism to drive the scissor lift mechanism between the lowered position and the raised position.

In some embodiments, the interior container comprises a plurality of drawers located on a left side, a right side, and/or a front face of the interior container.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 6A is a front view of the storage device of FIG. 1 with a third embodiment interior container.

FIG. 7 is a perspective isometric view of a lift mechanism of the storage device of FIG. 1.

FIG. 18 is a front view of fourth embodiment interior containers of the storage device of FIG. 1.

DETAILED DESCRIPTION

Figure 1:
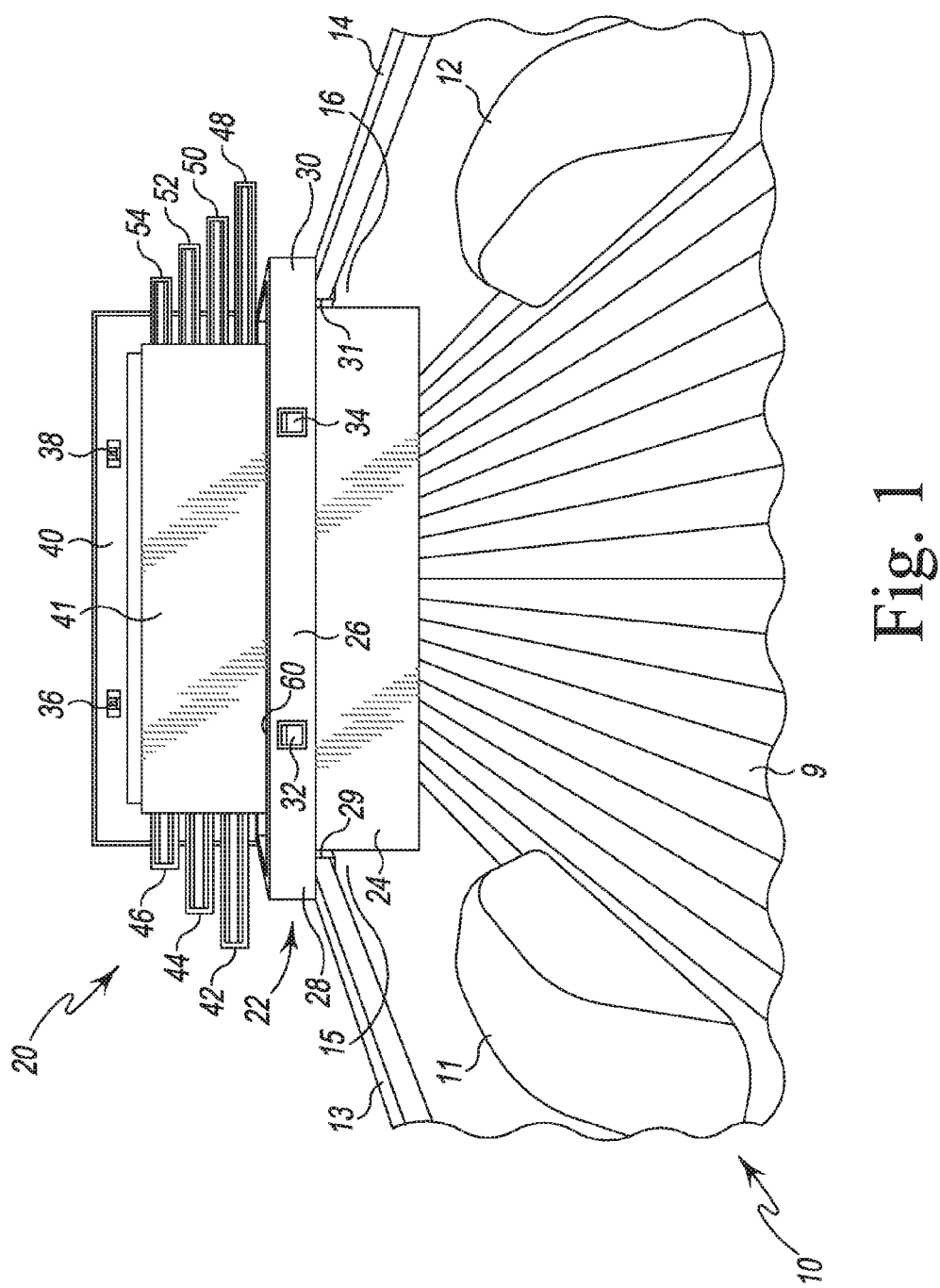
FIG. 1 is a front view of a storage device for a vehicle shown mounted in the bed of a truck.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a storage device 20 for a truck. The storage device 20 mounted in the bed 10 of the truck. The storage device 20 is mounted so the length of the storage device extends across the bed of the pickup truck between a first side rail 13 and a second side rail 14 of the bed 10 adjacent the front boundary of the bed 10 and adjacent the cab 17 of the truck.

The storage device 20 comprises an exterior container 22, an interior container 41, and a lift mechanism 131. The lift mechanism 131 is configured to raise and lower the interior container 41 relative to the exterior container 22.

The exterior container 22 comprises a base 24, a top portion 26, and a lid 40. The base 24 comprises a front wall 106, a left side wall 112, a right side wall 110, and a back wall 108. The top portion 26 extends from the base.

The top portion 26 comprises a left wing 28 and a right wing 30. The left-wing 28 is configured to be located over the left side rail 13 of the bed 10. The right wing 30 is configured to be located over the right side rail 14 of the bed 10. The left and right wings support the exterior container on the respective side rails of the bed above the bed floor 9. In some embodiments, the exterior container may rest on the bed floor as well.

Left clamp 29 and right clamp 31 extend from the respective left wing and right wing and under the respective left rail 13 and right rail 14 to secure the exterior container 22 to the bed rails by clamping force about the rails 13 and 14. The clamping force prevents the movement of the exterior container relative to the truck bed.

Figure 5:
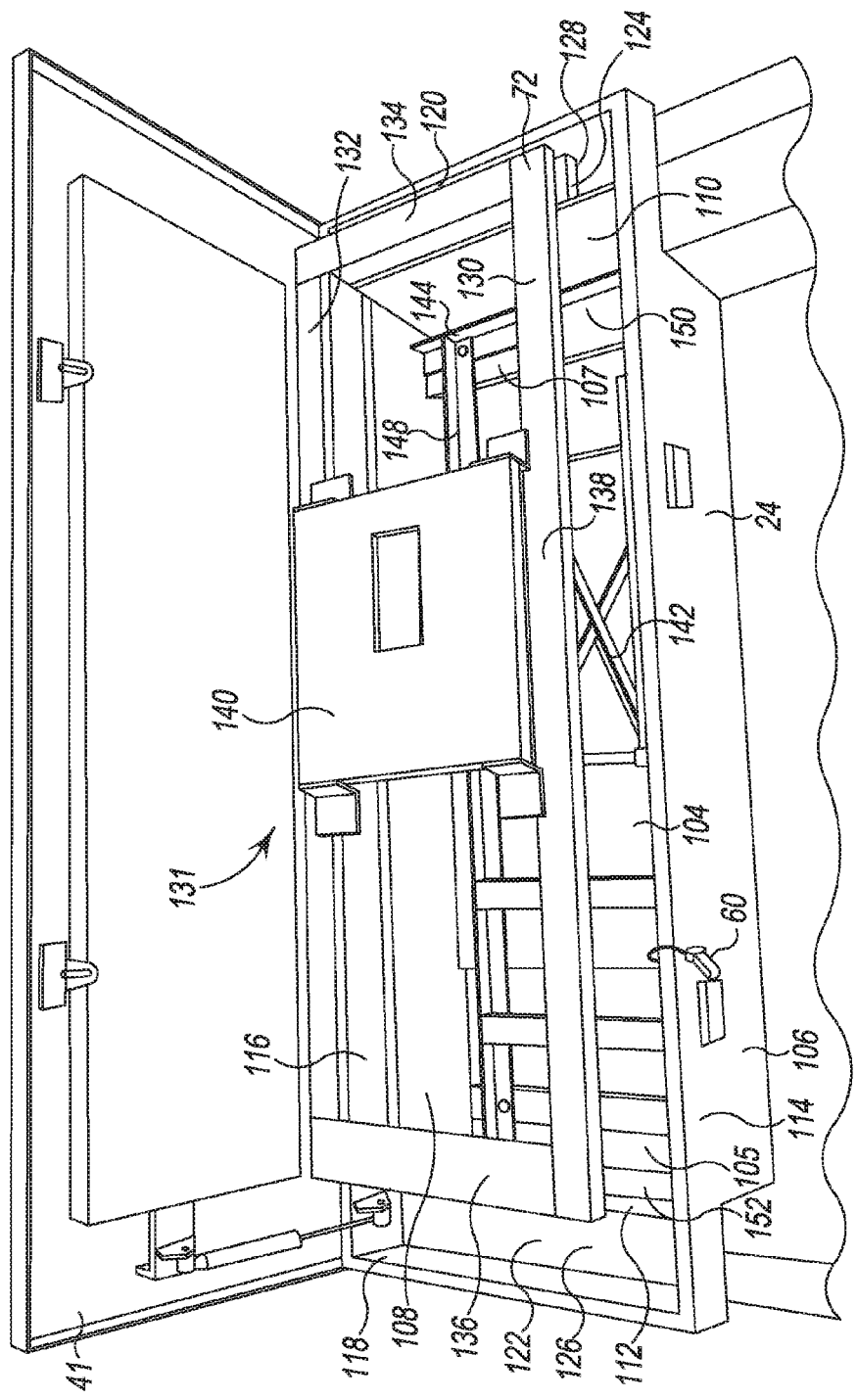
FIG. 5 is a perspective top view of the storage device of FIG. 1.

As shown in FIG. 5, the top portion 26 comprises a front wall 114, a back wall 116, a left side wall 118, and a right side wall 120. In some embodiments, such as the embodiment shown in FIG. 1, the top portion is wider than the base in all horizontal directions. Therefore, the front wall 114 is positioned rearward of the front wall 106. The back wall 116 is positioned forward relative to the back wall 108. The left side wall 118 is spaced leftward relative to the left side wall 112. The right side wall 120 is spaced rightward relative to the right side wall 110. Therefore the horizontal area in the top portion 26 is greater than the horizontal area in the base 24. In some embodiments, the top portion is wider only in the right and left horizontal directions, but not in the front and rear horizontal directions.

As shown in FIG. 1, a vertical depth of the base 24 is greater than the vertical depth of the top portion 26. Therefore, more of the exterior container 22 is located below the top of the side rails 13 and 14 than is located above.

The lid 40 is attached to the base by a hinge. The hinge connects to a first side of the lid. The hinge also connects to an exterior surface of the back wall 116 of the top portion 26. The hinge allows the lid to pivot between an open position as shown in FIGS. 1 and 5 and a closed position (not shown) where the lid rests on or adjacent the top edge 27 of the top portion 26. When the lid is in the closed position, the exterior housing provides an enclosed space containing the interior container 41 and the lift mechanism 131.

When the lid is in the closed position, the male elements 36, 38 engage with the female latches 32, 34 to releasably secure the lid in the closed position. The female latches 32, 34 comprise handles which when pulled upward released the latch mechanism and allow the male elements 36, 38 to withdraw from the female latches.

Figure 2:
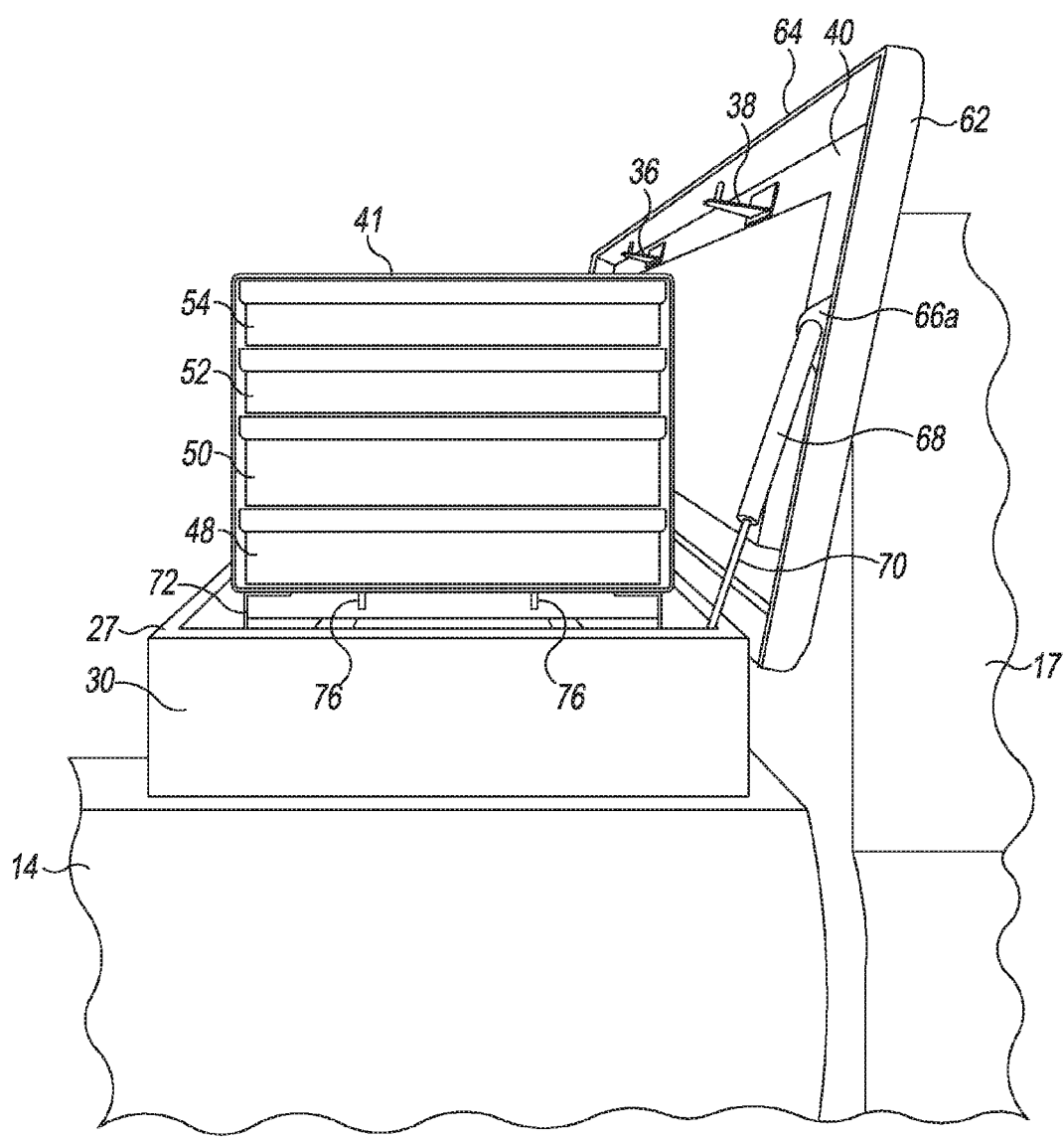
FIG. 2 is a right side view of the storage device of FIG. 1.
Figure 3:
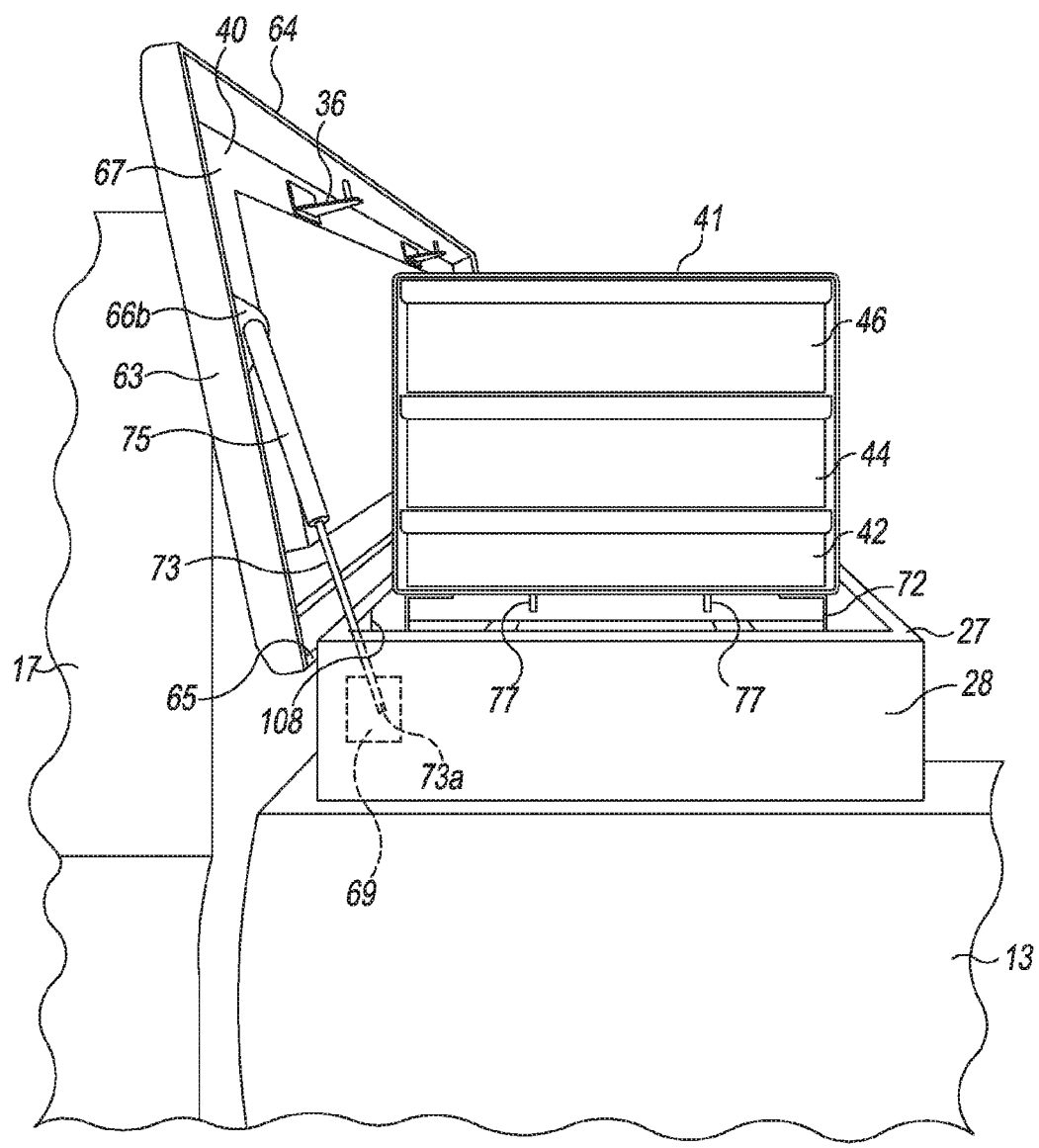
FIG. 3 is a left side view of the storage device of FIG. 1.

As shown in FIGS. 2 and 3, the lid may comprise a perimeter skirt 62, 63, 64, 65, which extends away from the main portion 67. The right and left sides of the lid comprise a right cylinder mount 66a and a left cylinder mount 66b, respectively. The mounts 66a, 66b may be plates extending from the main portion 67 and comprising an aperture for receiving a pivotable attachment to a right lift cylinder 68 and a left lift cylinder 75, respectively. At an end 73a (right side not shown) opposite the attachment to the lid, the lift cylinder 75 pivotal attaches to a mounting tab 69 (right side not shown) of the top portion 26 which extends from the back wall 116.

As shown in FIGS. 5 and 7, the lift mechanism 131 is supported on the floor 104 of the base 24. The lift mechanism 131 comprises an upper frame 72, a lower frame 144, a scissor mechanism 162, a scissor lift 163, and a drive mechanism 218. Spacing blocks 105, 107 may be provided at opposite sides of the base to support the lower frame 144 above the floor 104 and to space the lower frame 144 from the floor 104.

The interior container 41 is supported on the upper frame 72 of the lift mechanism 131. The interior container 41 may be attached to the upper frame on opposite sides by bolts or studs 76, 77 as shown in FIGS. 2 and 3. The bolts penetrate holes in the upper frame 72 and nuts are fastened from the underside to secure the interior container 41 to the upper frame 72. Other means and devices for connecting the interior container to the upper support frame may be provided, such as welding, clamping, etc.

In one embodiment, the left end and the right end of the interior container 41 comprise drawers 42, 44, 46, 48, 50, 52, 54 as shown in FIGS. 1 to 4. The figures show that the left side of the interior container has three drawers and the right side has four drawers. However in other embodiments, each side may contain any number of drawers. In some embodiments, the right side contains the same number of drawers as the left side. In some embodiments, each of the right and left sides comprise between 1 and 10 drawers. The of height each drawer can be, but need not be, the same. The number of drawers and their respective height may be determined by the area which is available within the exterior container between the floor 104 and the lid 40, when the lid is in the closed position.

Figure 4:
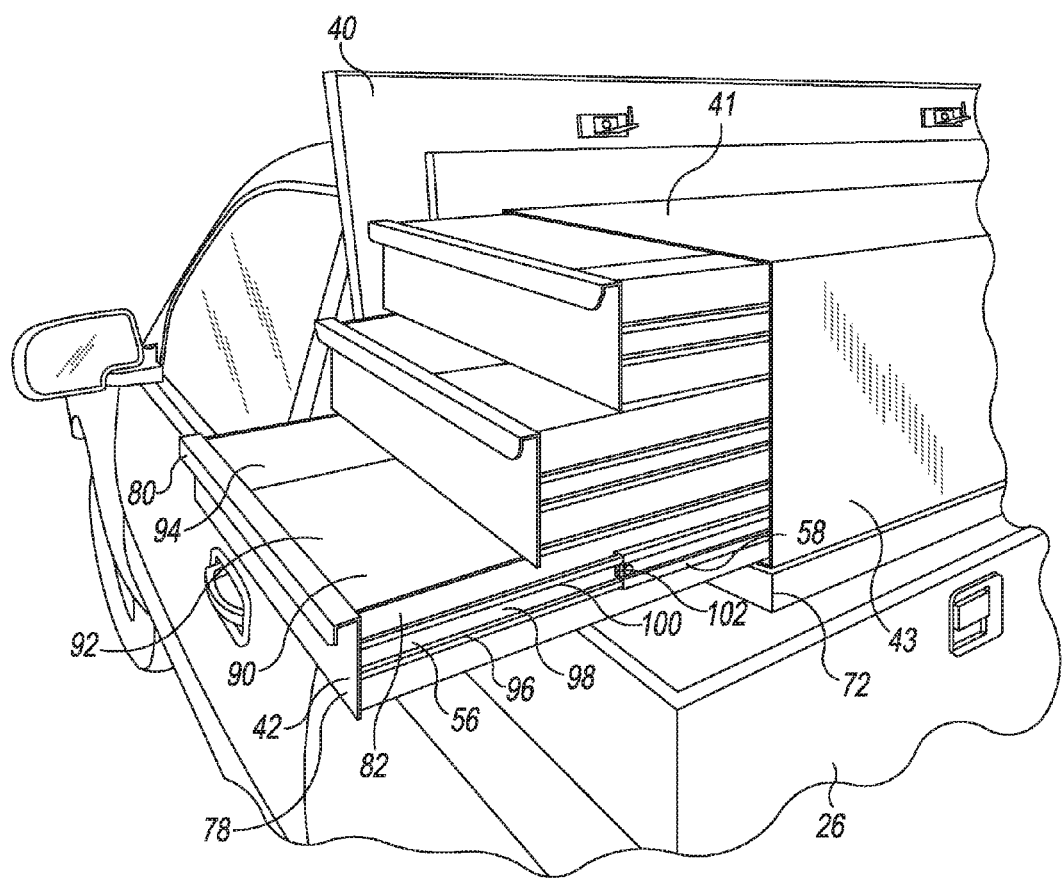
FIG. 4 is a perspective left side view of the storage device of FIG. 1.

Each of the drawers may comprise a handle as shown in FIGS. 2 through 4. FIG. 4 shows a perspective view of the drawers on the left side. Drawer 42 comprises an interior space 90 defining a semi enclosed space by a front wall 78, a first side wall 94, a second side wall 82, a rear wall (not shown), and a floor 92. The drawer 42 comprises a handle 80. The drawers are slidably connected to a body 43 of the interior container 41. The connection of the drawers allows them to slide in and out of the body 43. In some embodiments, the slide path of the drawers is horizontal or substantially horizontal.

The drawers may be slidably attached to the body 43 on slide tracks such as those which are known in the art. FIG. 4 shows one embodiment of the slide track. The slide tracks are provided on both sides of each drawer. FIG. 4 shows a first slide track 56 of the drawer 42. The first slide track 56 comprises a lower rail 99 spaced apart from an upper rail 100 by a recessed region 98. The first slide track 56 is fixed to the drawer 42. The first slide track 56 is received in a second track 58. A second slide track 58 is fixed to the body 43. The second slide track 58 comprises a roller 102 that is positioned between the lower rail 99 and the upper rail 100 of the first track 56. The roller facilitates the sliding of the first slide track relative to the second slide track and thereby the drawer relative to the body 43. The other drawers 44, 46, 48, 50, 52, 53 are slidably attached on both sides to the body in the same manner as described above with respect to drawer 42.

Figure 6:
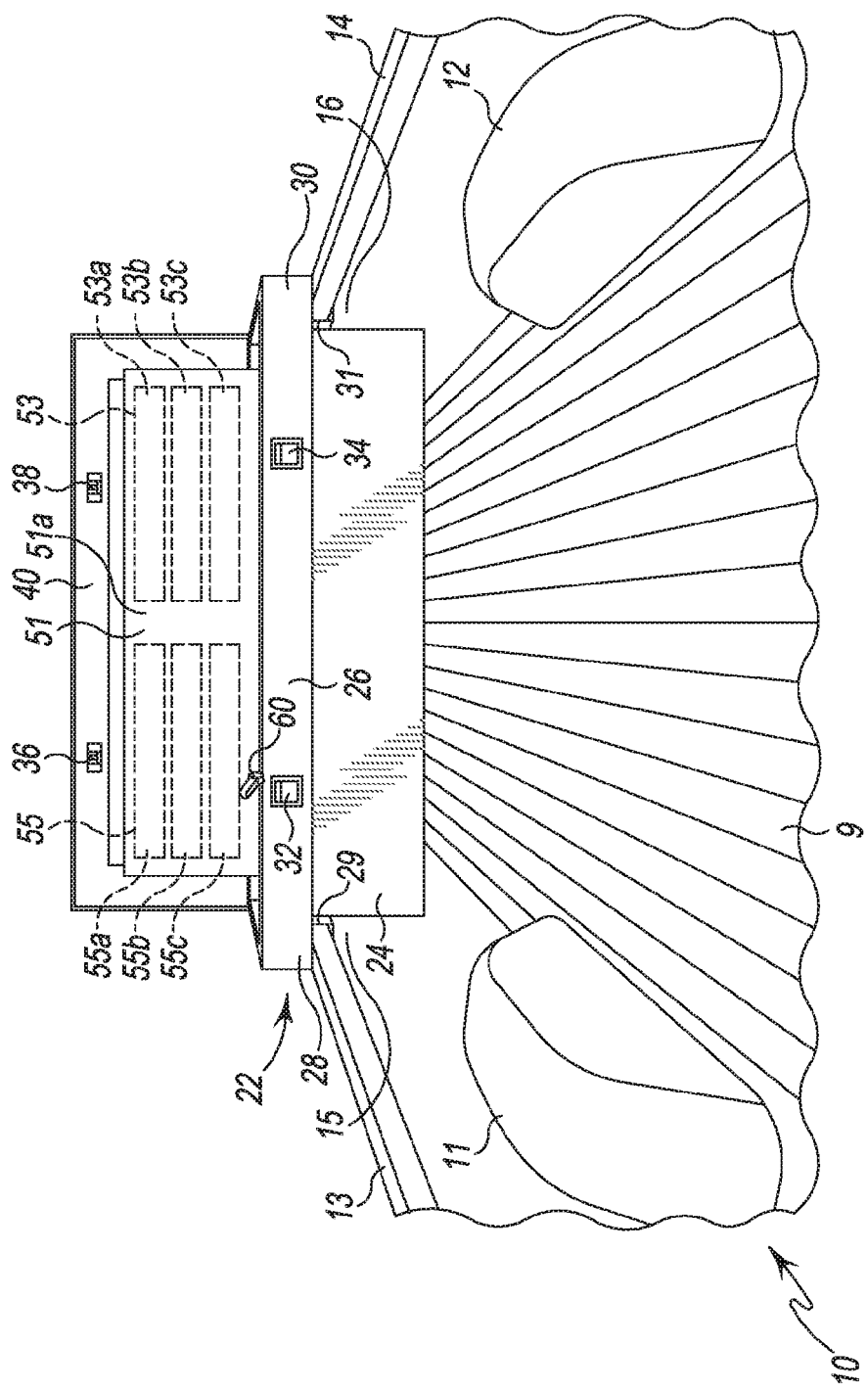
FIG. 6 is a front view of the storage device of FIG. 1 with a second embodiment interior container.

A second embodiment interior container 51 is shown in FIG. 6. Container 51 is identical to container 41 except that container 51 has drawers that extend from the front face 51a of the container rather than from the left and right sides as is provided with container 41. A right drawer bank 53 comprises drawers 53a, 53b, 53c. A left drawer bank 55 comprises drawers 55a, 55b, 55c. The drawers slide rearward and forward relative to the front face 51a on slide tracks of the type described with respect to container 41. The container 51 will have vertical supports (not shown) on opposite sides of each drawer for attaching the slide tracks and thereby supporting the drawers. In some embodiments, the interior container can have a combination of right and/or left side drawers, such as drawers 42, 44, 46, 48, 50, 52, 54 as well as front sliding drawers such as draws 53a-c, 55a-c.

A third embodiment interior container 61 is shown in FIG. 6A, the left and right side drawers are shallower, and one set of front sliding drawers 61a is centered between the right and left sides of the interior container. Therefore the interior container can have right 48, 50, 52, 54 and left side drawers 42, 44, 46 as well as front sliding drawers 61a.

Referring to FIG. 5, the lift mechanism 131 fits laterally between the right sidewall 110 and the left side wall 112. In some embodiments, the lift mechanism does not extend into the right wing area 124 or the left wing area 122. The right wing area 124 has a right wing floor 128. The left wing area 122 has a left wing floor 126. The lower frame 144 is attached to the support blocks 105, 107 by bolts, screws, welding, adhesives, or other fasteners. The support blocks may be fixed to the floor 104 of the exterior container by bolts, screws, welding, adhesives, or other fasteners.

The lift mechanism 131 is shown in FIG. 7. The upper frame 72 comprises a front bar 132, a rear bar 130, a left side bar 134, and a right side bar 136. The bars 130, 132, 134, 136 are connected to form a rectangle. The lower frame 144 comprises a front bar 148, a rear bar 154, a left side bar 150, and a right side bar 152. The bars 148, 150, 152, 154 are connected to form a rectangle.

In some embodiments, the lower or upper frame or both may comprise crossmember support bars 156, 158 on either side of the scissor mechanism 162. The crossmember support bars may be perpendicular to bars 154, 148 or maybe positioned to create oblique or acute angles relative to bars 154, 148. In some embodiments, the upper frame and the lower frame have the same shape and size. The upper frame comprises open areas 141, 143 between the bars and the scissor mechanism 162. The lower frame comprises open areas 145, 147 between the bars and the scissor mechanism 162.

Figure 8:
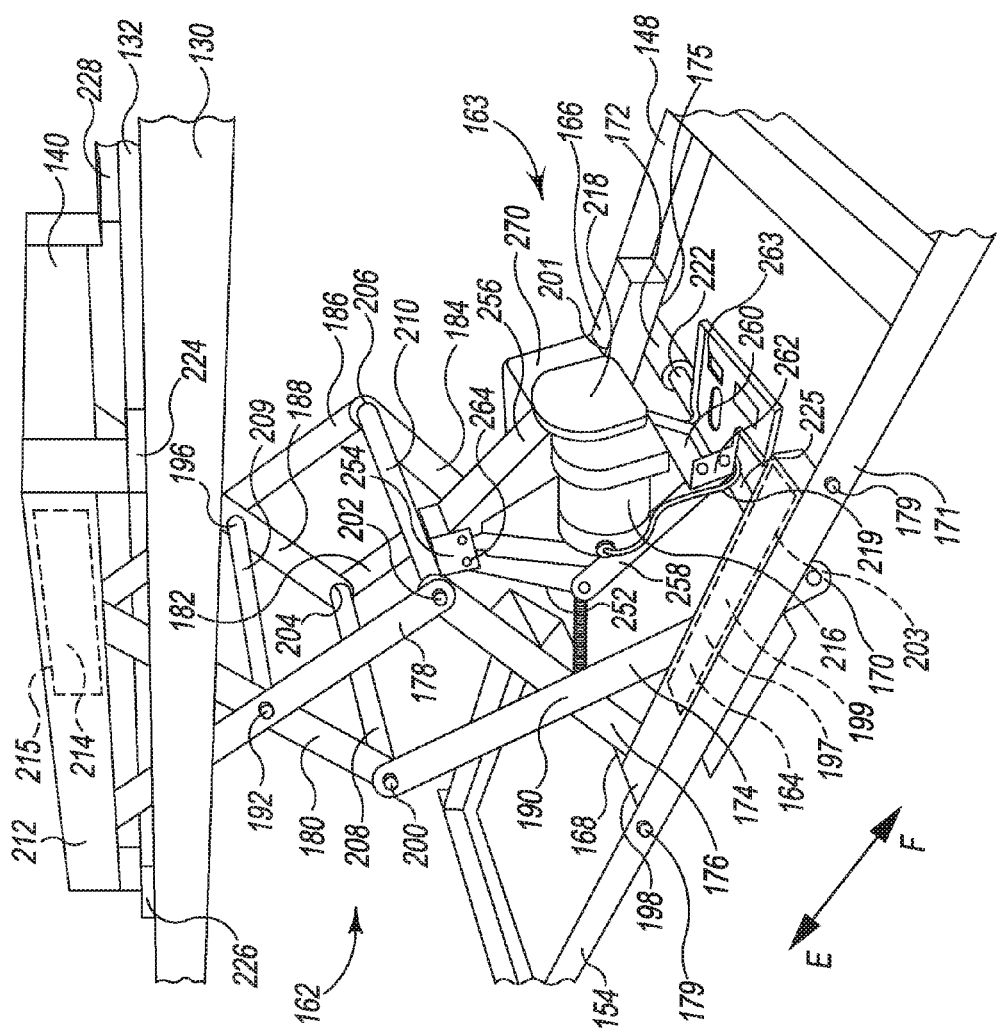
FIG. 8 is a perspective front view of the lift mechanism of FIG. 7.

In some embodiments, each of the bars 130, 132, 134, 136, 148, 150, 152, 154 comprise a L-shape in cross-section as shown in FIGS. 7 and 8. In some embodiments, bars 156, 158 are also L-shaped. In some embodiments, each of the bars 130, 132, 134, 136, 148, 150, 152, 154, 156, 158 are rectangle, square, triangle, round, or other shape in cross-section. In some embodiments, some bars comprise one shape in cross-section, and other bars comprise another shape in cross-section.

The scissor mechanism 162 is shown in more detail in FIG. 8. The scissor mechanism comprises longitudinal base bars 164, 166 which are attached to bars 154, 148, respectively, in a parallel. The longitudinal base bars 164, 166 may fit within the L-shape of the bars 154, 148, respectively. The longitudinal base bars 164, 166 may be fixed by welding or bolts 179, or other fasteners to bars 154, 148, respectively.

The scissor mechanism comprises a crossbar 168 that is connected and extends between the longitudinal base bars 164, 166 and a first end 198. The crossbar 168 may also attach to bars 154, 148. At a second end 199 of the base bars 164, 166 is a pivot bar 222. Sleeves 170, 172 are attached to the bottom 171, 173 of the bars 154, 148 respectively. The sleeves 170, 172 receive opposite sides of the pivot bar 222 and allow the pivot bar to pivot relative to the fixed sleeves 170, 172. The sleeves 170, 172 may also be attached to the bottom of longitudinal base bars 164, 160, respectively.

In some embodiments, sleeves 170, 172 are attached to bars 154, 148 respectively, above the bottoms 171, 175, respectively to allow the base bars to rest flat along their length on a bottom 104 of the exterior container.

The first rear scissor bar 174 is pivotally positioned at a bottom end in a first lower slide track 203 of the longitudinal base bar 164, and at a top end pivot location 200 to a fourth rear scissor bar 180. The bottom end of the bar 174 is shown at the second position 197 adjacent the sleeve 170 in FIG. 8. The second rear scissor bar 176 is pivotally attached at a bottom end to the crossbar 168 adjacent the first longitudinal base bar 164 at a first end 198, and at a top end pivot location 202 to a third rear scissor bar 178. First rear scissor bar 174 crosses and is pivotally connected at a first rear pivot location 190 to the second rear scissor bar 176. The first rear pivot location 190 is located at a midpoint along the length of the first and second rear scissor bars 174, 176.

The third rear scissor bar 178 is pivotally attached at a top end to a first end 212 of the upper platform 140. A top end 214 of the fourth rear scissor bar 180 is pivotally and slidably located in a first upper slide track 215 of the upper platform 140. The third rear scissor bar 178 crosses and is pivotally connected at a second rear pivot location 192 to the fourth rear scissor bar 180.

The first front scissor bar 182 is pivotally and slidably positioned at a bottom end in a second lower slide track 205 of the longitudinal base bar 166, and at a top end pivot location 204 to a fourth front scissor bar 188. The bottom end of the scissor bar 182 is shown at a second position 201 adjacent the sleeve 173 in FIG. 9. The second front scissor bar 184 is pivotally attached at a bottom end to the crossbar 168 adjacent the longitudinal base bar 164 at a first end 167, and at a top end pivot location 206 to a third front scissor bar 186. First front scissor bar 182 crosses and is pivotally connected at a first front pivot location 187 to the second front scissor bar 184. The first front pivot location 187 is located at a midpoint along the length of the first and second front scissor bars 182, 184.

The third front scissor bar 186 is pivotally attached at a top end to a first end 213 of the upper platform 140. A top end 211 of the fourth front scissor bar 188 is pivotally and slidably located in a second upper slide track 217 of the upper platform 140. The third front scissor bar 186 crosses and is pivotally connected at a second front pivot location 189 to the fourth front scissor bar 188.

First connecting crossbar 210 fixedly connects the second rear scissor bar 176 to the second front scissor bar 184 at top end pivot locations 202, 206 respectively. Second connecting crossbar 208 fixedly connects the fourth rear scissor bar 180 to the fourth front scissor bar 188 at top end pivot locations 200, 204 of the first front and rear scissor bars 182, 174, respectively. The third connecting crossbar 209 fixedly connects the fourth rear scissor bar 180 to the fourth front scissor bar 188 at the second rear pivot location 192 and the second front pivot location 189.

The second rear pivot location 192 is located at a midpoint along the length of the fourth and third rear scissor bars 180, 178. The second front pivot location 189 is located at a midpoint along the length of the fourth and third front scissor bars 186, 188.

The upper platform 140 is attached to bars 130, 132 at the four corners of the upper platform 140 with L-brackets 224, 226, 228, 230. The L-brackets may be bolted or welded or attached with other fasteners.

Figure 10:
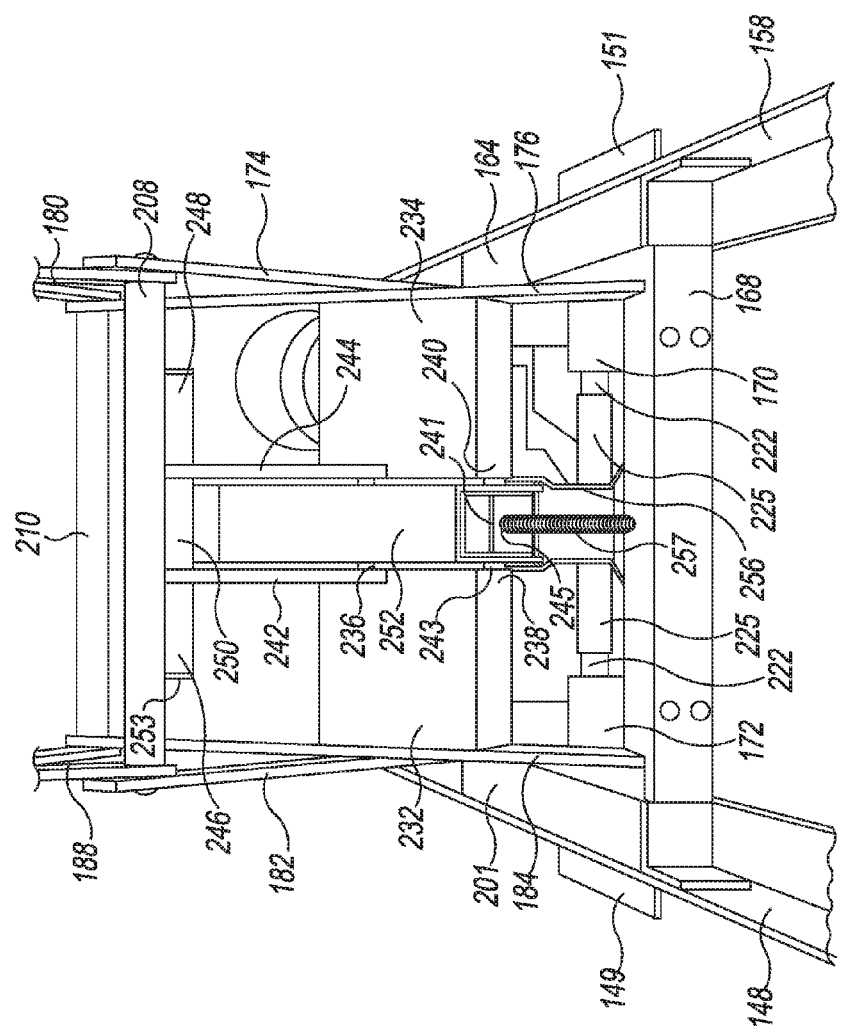
FIG. 10 is a right side end view of a portion of the lift mechanism of FIG. 7.

FIG. 10 shows a portion of the scissor mechanism 162. A first cross plate portion 232 is fixed to scissor bar 184. A second cross plate portion 234 is fixed to scissor bar 176. The first cross plate portion 232 and the second cross plate portion 234 are aligned horizontally relative to scissor bars 184, 176 as shown in FIG. 10. A cross plate gap 236 is provided between the first cross plate portion 232 and the second cross plate portion 234. The first cross plate portion 232 comprises an interior edge 238. The second cross plate portion 234 comprises an interior edge 240.

Figure 9:
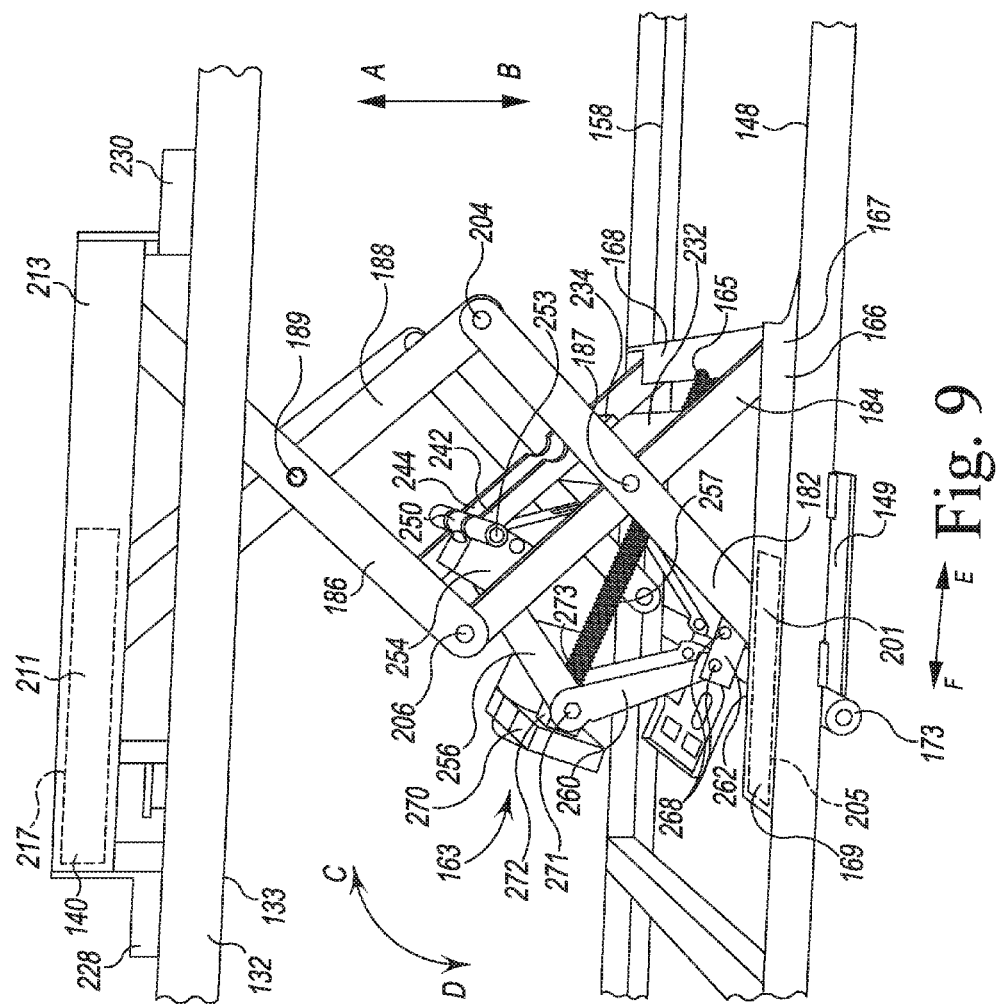
FIG. 9 is rear view the lift mechanism of FIG. 7.

A first tower support plate 242 is attached to or adjacent the interior edge 238 of the first cross plate portion 232. A second tower support plate 244 is attached to or adjacent to the interior edge 240 of the second cross plate portion 234. The first and second tower support plates 242, 244 continue upward from the first and second cross plate portions 232, 234 as shown in FIG. 9. Each of the first and second tower support plates have a pin housing 246, 248.

Between the pin housing 246, 248 and between the first and second tower support plates 242, 244 a scissor lift connecting cylinder 250 is located. A pin 253 is provided through pin housing 256, through scissor lift connecting cylinder 250, and through pin housing 248 to pivotally connect the scissor lift connecting cylinder 250, and thereby the scissor lift 163, to the first and second tower support plates 242, 244.

The scissor lift 163 comprises a lower support bracket 262, an upper support bracket 254, a first lower scissor arm 258, a second lower scissor arm 260, a first upper scissor arm 252, and a second upper scissor arm 256. The lower support bracket 262 may comprise a footplate 263. The first lower scissor arm 258 is pivotally attached to the lower support bracket 262 at a first lower pivot pin 268. The second lower scissor arm 260 is pivotally attached to the lower support bracket at a second lower pivot pin 268. In one embodiment, the first and second lower pivot pins 268 are spaced apart as shown in FIG. 9 so that the first and second lower scissor arms may pivot at the lower support bracket 262 without interfering with each other. Therefore the first and second lower scissor arms are located adjacent opposite ends of the lower support bracket.

The first upper scissor arm 252 is pivotally attached to the upper support bracket 254 at a first upper pivot pin 264. The second upper scissor arm 256 is pivotally attached to the upper support bracket 254 at a second upper pivot pin 264. In one embodiment, the first and second upper pivot pins 264 are spaced apart as shown in FIG. 8 so that the first and second upper scissor arms may pivot at the upper support bracket 254 without interfering with each other. Therefore, the first and second upper scissor arms are located at opposite ends of the upper support bracket.

The first upper scissor arm 252 is pivotally connected to the first lower scissor arm 258 at a first pivot bracket 241. The arms 252, 258 are connected to the pivot bracket 241 by bolts 243 as shown in FIG. 10. The first pivot bracket 241 has a central threaded opening 245 that engages and allows a threaded shaft 257 to threadedly pass through.

The second upper scissor arm 256 is pivotally connected to the second lower scissor arm 260 at a second pivot bracket 272. The arms 256, 260 are connected to the second pivot bracket 272 by a fastener, such as bolt 271. The second pivot bracket 272 is attached to or integrally formed with a drive mechanism housing 270 or a portion thereof. The scissor lift connecting cylinder 250 is fixed to the upper support bracket 254.

The drive mechanism 218 comprises a motor 216, a transfer gear (not shown), and a driven gear (not shown). The motor drives an output shaft having a drive gear (not shown). The drive gear is meshed with the transfer gear and drives the transfer gear. The transfer gear is a meshed with a driven gear. The driven gear is fixed to one end of the threaded shaft 257. Therefore the motor, via the gearing, drives the threaded shaft 257 to rotate. In some embodiments, the motor as a first function to the drive output shaft to rotate in a first direction and a second function to drive the output shaft to rotate in an opposite second direction. In some embodiments, the first direction causes the scissor lift to rise and the second direction causes the scissor lift to lower. In some embodiments, the motor is an electric motor. In some embodiments, the motor directly drives the threaded shaft.

The motor can be connected to a power source, such as a vehicle battery, by a cable 219. In some embodiments, the vehicle battery or other power source is a 12 volt power source and the motor is adapted to operate from a 12 volt power source. In some embodiments, the vehicle or other power source is adapted to provide 110 volt power and the motor is adapted to operate from a 110 volt power source. The cable 219 may comprise a control switch 60. The control switch provides three positions, a raise position, a lower position and a neutral position. When in the raise position the switch causes power to be provided to the motor to cause the motor to rotate in the first direction. When in the lower position, the switch causes the power to be provided to the motor to cause the motor to rotate in a second direction opposite the first direction. In the neutral position the power switch provides no power to the motor so that the motor does not turn and the lift mechanism does not raise or lower.

The switch 60 may be located at the front of the exterior container as shown in FIGS. 1 and 5. In some embodiments, the switch 60 may be located at either the left or right side of the exterior container so that it is readily available adjacent the doors of the truck cab. In some embodiments, the switch can be located at 126 in FIG. 5 and at the same location on the opposite side. In some embodiments, two switches for controlling the motor and the lift mechanism are provided, one at each of the left and right sides of the exterior container.

While the figures show the switch is in wired communication with the battery and motor, in some embodiments the switch is within a wireless handheld device that is wireless communication with a receiver or transceiver, which is in wired control communication with the motor. Communication between the handheld device and the receiver or transceiver may comprise an authentication function on the handheld device and the receiver or transceiver for ensuring the handheld device is authorized to instruct the receiver or transceiver. Communication between the handheld device and/or the receiver or transceiver may comprise an encryption function on the handheld device and/or the receiver or transceiver for providing encrypted communication between the handheld device and the receiver or transceiver.

In one embodiment, the power is available to the switch only when the vehicle's ignition switch is in the on condition/position. Therefore the lift mechanism can only be operated when the vehicle's ignition switch is in the on condition/position.

The second pivot bracket 272 comprises a cylindrical sleeve 273. The cylindrical sleeve 273 does not have threads that engage the threaded shaft 257. Therefore the threaded shaft rotates freely within the sleeve 273.

When the motor 216 drives the output shaft to rotate in the first direction, the threaded shaft is rotated in the first direction. When the threaded shaft is driven in the first direction the threaded engagement between the threaded shaft 257 and the first pivot bracket 241 causes the first pivot bracket to be drawn towards the second pivot bracket 272. This draws the first upper scissor arm 252 towards the second upper scissor arm 256 and it also draws the first lower scissor arm 258 towards the second lower scissor arm 260. This movement causes the upper support bracket 254 to move away from the lower support bracket 262. As the upper support bracket 254 moves away from the lower support bracket 262 the scissor lift 163 is raised.

When the threaded shaft is not rotated, the lift mechanism will maintain its position and will not raise or lower. This is due to the threaded engagement with the first pivot bracket 241 and the connection to the second pivot bracket.

The lower support bracket 262 is fixed to the pivot bar 222. The pivot bar 222 is operatively connected to the lower frame 144. When the lower frame 144 is supported on the ground or against the floor 104 of the exterior container 22, operating the motor in the first direction will cause the upper support bracket 254 to rise. Since the upper support bracket 254 is operably attached to the scissor mechanism 162, operating the motor in the first direction will cause the scissor mechanism to rise in the direction A of FIG. 9. The upper support bracket 254 will cause the plates 242, 244 to draw upward the scissor mechanism via the plates 242, 244 attachment to the first and second cross plate portions 232, 234 and the first and second cross plate portions attachment to scissor bars 184, 176.

The upper ends of the scissor bars 184, 176 will rise driving upward the bars 180, 186, which raises the platform 140, which raises the upper frame 74. As bars 184, 176 raise upward, the bottom ends of bars 174, 182 are drawn forward in the direction E of FIGS. 8 and 9 within the slide tracks 203, 205. As the bottom ends of the bars 174, 182 are drawn forward in direction E, each of the bars 174, 182 pivot about the respective pivot locations 190, 187. The pivoting drives the upper ends of each of the bars 174, 182 which forces through the pivot locations 204, 202 the bars 188 and 178 upward. As bars 188, 178 or driven upward they drive the platform 140 upward and thereby drive the upper frame 74 upward in the direction A.

When the scissoring mechanism is rising, bar 182 will be rotating and sliding in the direction E within the slide track 205, bar 182 will be pivoting at pivot location 187, and will be moving in an arcing path at pivot location 204 to enable the scissoring mechanism to rise. Similarly, bar 188 will be moving in an arcing path at pivot location 204, will be pivoting at pivot location 189, and will be rotating and sliding in slide track 217 in the direction E.

When the scissoring mechanism is rising, bar 174 will be rotating and sliding within the slide track 203 in the direction E, bar 174 will be pivoting at pivot location 190, and will be moving in an arcing path at top end pivot location 200 to enable the scissoring mechanism to rise. Similarly bar 180 will be moving in an arcing path at pivot location 200, will be pivoting at pivot location 192, and will be rotating and sliding in slide track 215 in the direction E.

When the scissoring mechanism is rising, bar 184 will be rotating at the first end 167, bar 184 will be pivoting at pivot location 187, and will be moving in an arcing path at pivot location 206 to enable the scissoring mechanism to rise. Similarly bar 186 will be moving in an arcing path at point location 206, will be pivoting at pivot location 189, and will be rotating at the first end 213.

When the scissoring mechanism is rising, bar 176 will be rotating at the first end 198, bar 176 will be pivoting at pivot location 190, and will be moving in an arcing path at pivot location 202 to enable the scissoring mechanism to rise. Similarly bar 178 will be moving in an arcing path at pivot location 202, will be pivoting at pivot location 192, and will be rotating at the top end 214.

As the scissor lift rises, it will rotate at the pivot bar 222 in the direction C shown in FIG. 9. The pivot bar 222 will rotate within the sleeves 170, 172. As the scissor lift rises, the plates 242, 244 pivot about the pin 253 in the direction C.

As the scissor mechanism raises, bars 174, 182 will rotate and slide in the direction E within the respective slide tracks 203, 205. Bars 180, 188 will rotate and slide in the direction E within the respective slide tracks 215, 217. Therefore the lower ends of bars 174, 182 will move toward the bottom ends of bars 176, 178 respectively. The upper ends of bars 180, 188 will move toward the upper ends of bars 178, 186. As the scissoring mechanism raises, pivot locations 200, 202 will move toward each other and pivot location 204, 206 will also move toward each other.

When the motor is caused to be driven in the second direction, the threaded shaft 257 will rotate in the second direction. When the threaded shaft is driven in the second direction, the threaded engagement between the threaded shaft 257 and the first pivot bracket 241 causes the first pivot bracket to be moved away from the second pivot bracket 272. This moves the first upper scissor arm 252 away from the second upper scissor arm 256 and it also moves the first lower scissor arm 258 away from the second lower scissor arm 260. This movement causes the upper support bracket 254 to move toward the lower support bracket 262. As the upper support bracket 254 moves toward the lower support bracket 262 the scissor lift 163 is lowered.

When the lower frame 144 is supported on the ground or against the floor 104 of the exterior container 22, driving the motor in the second direction will cause the upper support bracket 254 to lower. Since the upper support bracket 254 is operably attached to the scissor mechanism 162, driving the motor in the second direction will cause the scissor mechanism to lower in the direction B of FIG. 9. The upper support bracket 254 will cause the plates 242, 244 to withdraw downward by the attachment of the plates 242, 244 to the first and second cross plate portions 232, 234 and the first and second cross plate portions attachment to scissor bars 184, 176. As the scissor lift lowers, it will rotate at the pivot bar 222 in the direction D shown in FIG. 9.

As the scissor mechanism lowers, bars 174, 182 will rotate and slide in the direction F within the respective slide tracks 203, 205. Likewise bars 180, 188 will rotate and slide in the direction F within the respective slide tracks 215, 217. Therefore the lower ends of bars 174, 182 will move away from the bottom ends of bars 176, 178 respectively. Likewise the upper ends of bars 180, 188 will move away from the upper ends of bars 178, 186. As the scissoring mechanism lowers, pivot locations 200, 202 will move away from each other and pivot location 204, 206 will also move away from each other.

Figure 12:
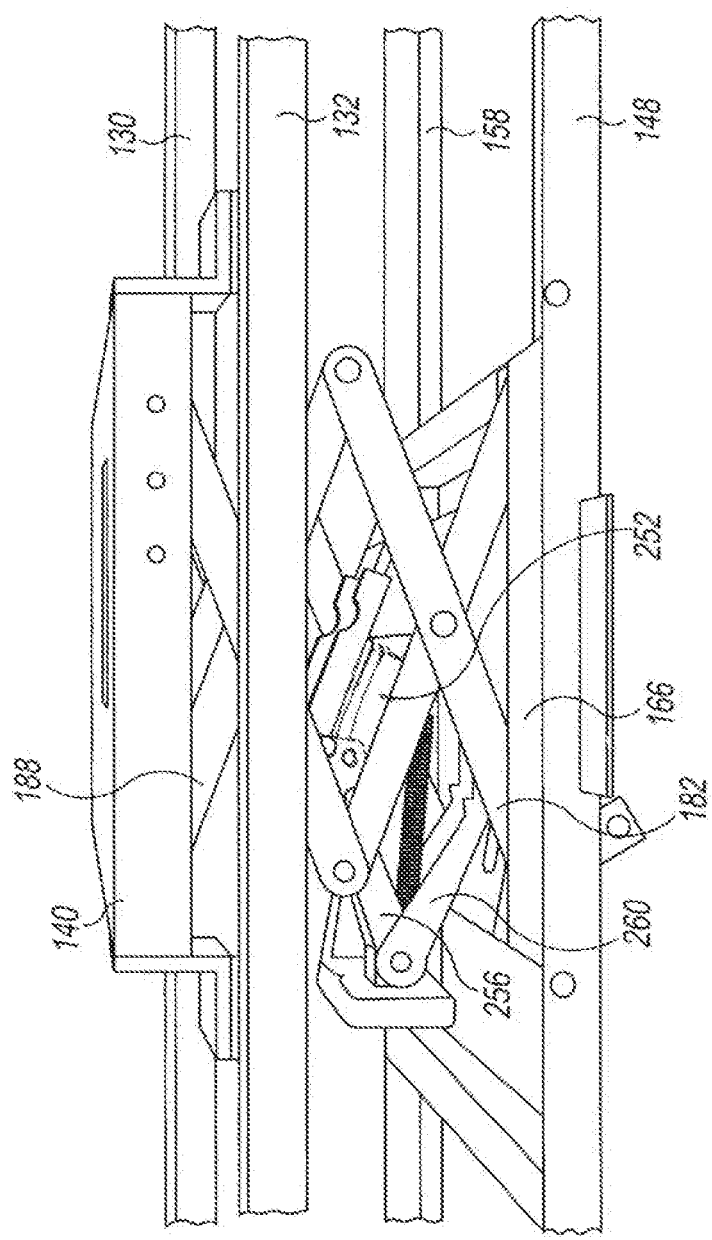
FIG. 12 is a rear view of the lift mechanism of FIG. 7 in a partially raised state.

The gap 236 between the first cross plate portion 232 and second cross plate portion 234 allows the scissor lift 163 including the threaded shaft 257 to move between the first and second cross plate portions 232, 234. This also allows the scissor lift 163 to be located between the first and second cross plate portions 232, 234 and between the first and second tower support plates 242, 244 when the scissor lift 163 and the scissor mechanism 162 are in or about the lowered position. FIG. 12 shows that the scissor lift 163 is partially located between the first and second cross plate portions 232, 234 where the scissor mechanism 162 is in a partially raised or partially lowered state.

A central notch 165 may be located along the crossbar 168 as shown in FIG. 9 to accommodate the position of the threaded rod 157 when the scissoring mechanism and the scissor lift are in a raised position.

Figure 11:
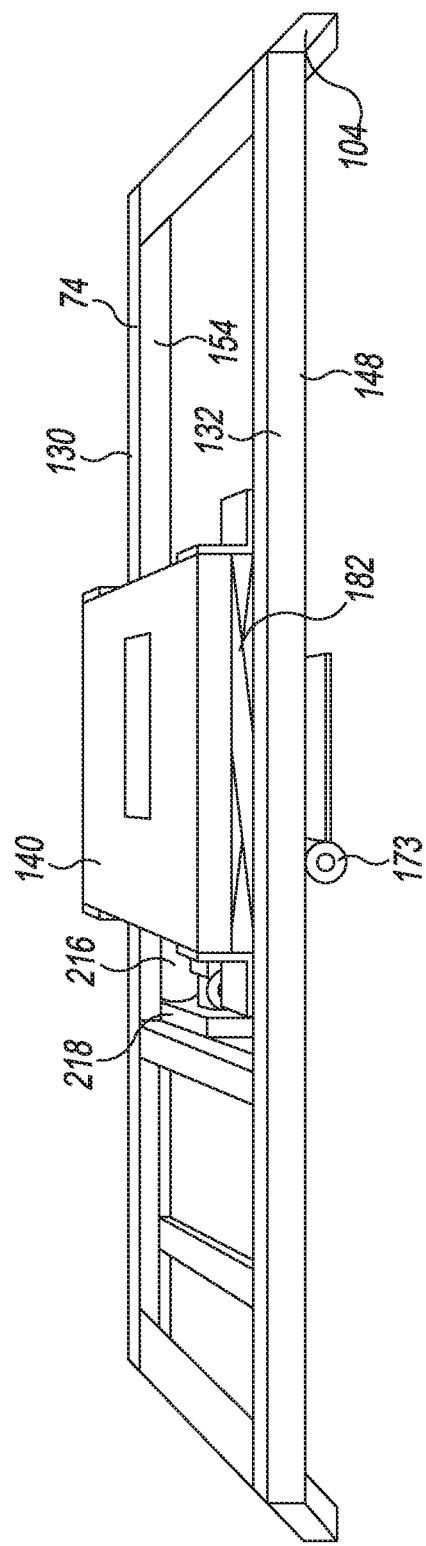
FIG. 11 is a rear view of the lift mechanism of FIG. 7 in a lowered state.

FIG. 11 shows the lift mechanism in a collapsed or a lowered state. In the lowered state the bars 130, 132 cover or substantially cover the bars 148, 154. Therefore the bars 148, 154 are received within bars 130, 132. This allows the lift mechanism to take up less space when in the lowered state.

In some embodiments, a bottom edge 133 of bar 132 contacts a horizontal stop bar 149 of bar 148 to prevent further collapsing of the lift mechanism when in the lowered state. Similarly, a bottom edge 133a of bar 130 contacts a horizontal stop bar 151 of bar 154 to prevent further collapsing of the lift mechanism when in the lowered state.

FIG. 12 shows the scissor lift and the scissor mechanism in a partially lowered or a partially raised state. The state shown in FIG. 12 provides the upper frame 74 in a position between the position shown in FIG. 9 and the position shown in FIG. 11. The scissor mechanism can be stopped and therefore positioned anywhere between a fully raised position and a fully collapsed position. The configuration of the scissoring mechanism in FIG. 12 shows that the bottom end of bars 182 is located in the slide track of longitudinal base bars 166 further in the direction E as compared to the position shown in FIG. 9. Similarly, the top end of the bar 188 is positioned further in the direction E along the second upper slide track 217 of the upper platform 140 as compared to the position shown in FIG. 9.

Arms 256, 260 are located closer together in the position shown in FIG. 12 as compared to the position shown in FIG. 9. As the scissoring mechanism is in more of a collapsed position, more of the threaded rod is located between the second pivot bracket 272 and the first pivot bracket 241. The first pivot bracket 241 is therefore located further along the length of the threaded shaft 257 away from the second pivot bracket in the position shown in FIG. 12 as compared to the position shown in FIG. 9. Both the scissor lift 163 and the scissor mechanism 162 occupy a shorter and longitudinally wider area when moving from a fully raised position downward toward a lowered position.

The lift mechanism maintains the interior container in the same orientation in the raised position, in the lowered position, and when moving between the raised position and a lowered position. Therefore the interior container does not rotate clockwise or counter-clockwise from the position shown in FIG. 1, but instead is moved vertically relative to the exterior container 22 and the truck.

The lift mechanism is configured to maintain interior container in a horizontal orientation when the scissor lift mechanism is in the raised position and when the scissor lift mechanism is in the lowered position. The lift mechanism maintains the interior container in the horizontal orientation when moving between the raised position and a lowered position.

In some embodiments, the bottom of the interior container is parallel or substantially parallel to the floor 104 of the exterior container or the bed floor 9 of the truck. The lift mechanism maintains the interior container parallel or substantially parallel to the floor 104 of the exterior container or the bed floor 9 of the truck when moving between the raised position and a lowered position In some embodiments, the lift mechanism is connected to the interior container only at the bottom of the interior container. The lift mechanism is located under the interior container to support the weight of the interior container and the contents loaded in the interior container.

Figure 13:
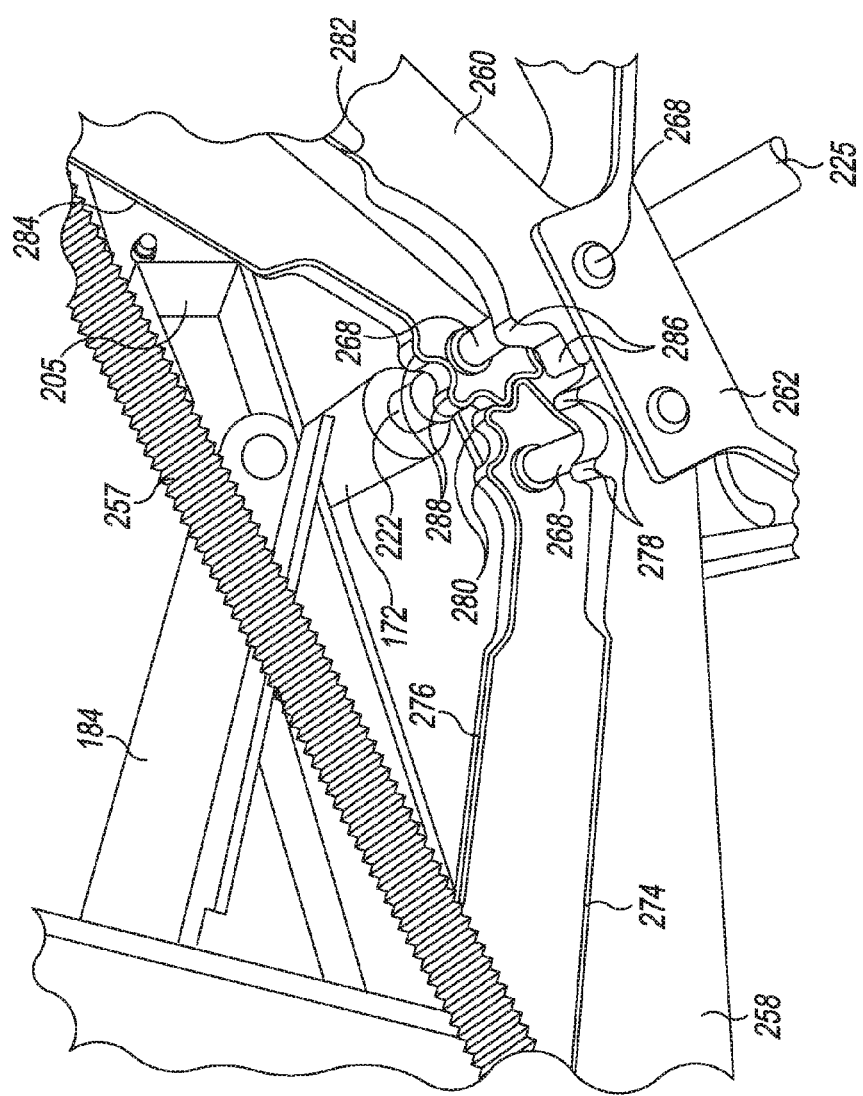
FIG. 13 is a perspective view of a portion of a scissor lift of the lift mechanism of FIG. 7.

FIG. 13 shows one embodiment where the arm 258 comprises teeth 278, 280 that mesh with teeth 286, 288 of arm 260 at lower support bracket 262. Arms 252 and 256 have identical teeth at the upper support bracket 254 but are not shown. The teeth 278, 280, 286, 288 form gears at the lower ends of arms 256, 260. Arm 258 has a first side wall 274 and a second sidewall 276. The teeth 278 extend from sidewall 274. The teeth 280 extend from sidewall 276. Arm 260 has a first sidewall 282 and a second sidewall 284. The teeth 286 extend from sidewall 282. Teeth 288 extend from sidewall 284. The teeth extend around the lower ends of each of the arms. The meshing of the teeth adds strength to the scissor lift. The pins 268 maintain the teeth of each adjacent arm at a predefined distance from the other so that the teeth of one arm properly mesh with the teeth of the other. The teeth of one arm engage the recesses between the teeth of the other arm. The teeth of one arm walk through the recesses between the teeth of the other arm as the scissor lift raises or lowers.

Figure 14:
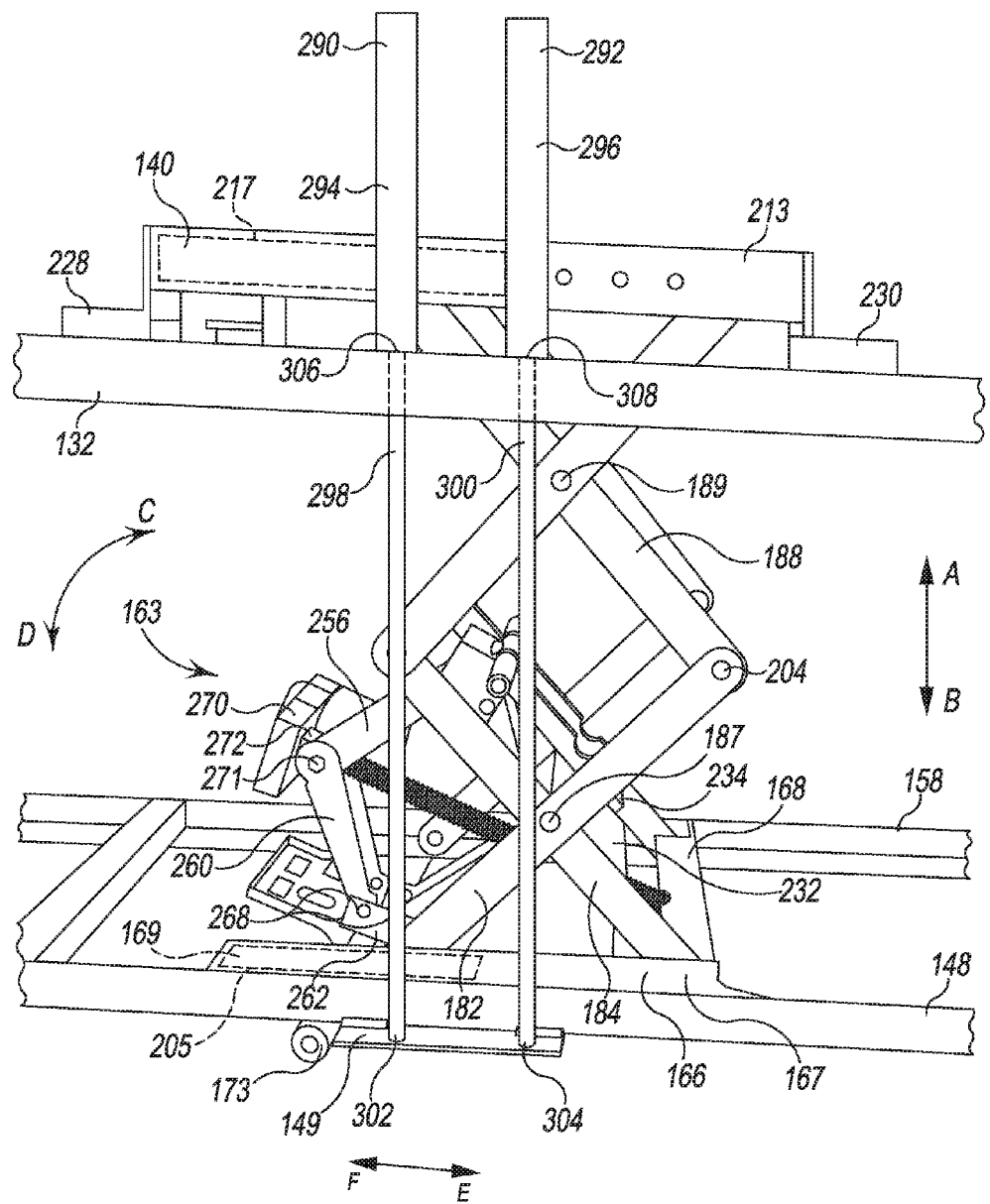
FIG. 14 is a rear view of a second embodiment lift mechanism comprising lift cylinders.

FIG. 14 shows a second embodiment lift mechanism comprising lift cylinders 290, 292. The rear side of the scissor mechanism 162 also comprises lift cylinders in a mirror image identical fashion about the longitudinal midplane of the scissoring mechanism arrangement located between bars 148, 158, so only the front side lift cylinders of FIG. 14 will be described.

Each lift cylinder comprises a cylinder 294, 296 and a shaft 298, 300. The shaft is movable in directions A and B of FIG. 14 relative to the cylinders 294, 296. The cylinders 294, 296 are not shown to scale. The bottom ends 302, 304 of each of the shafts 298, 300 are attached to the horizontal stop bar 149. The shafts 298, 300 are received in an opening on the bottom ends 306, 308 of the cylinders 294, 296. The opening on the bottom ends is sized to tightly seal the interface between the cylinders 294, 296 and the shafts 298, 300. The bottom ends 306, 308 are attached to the top of the bar 132. Shaft apertures (not shown) are provided in the upper surface of the bar 132 to allow the shafts 298, 300 to extend through toward the horizontal stop bar 149.

The cylinders 294, 296 comprise compressed air, gas, or liquid which causes the shafts to be biased to the extended position in the direction B. As the bottom ends 306, 308 are fixed to the top of the bar 132 and the shafts 298, 300 are attached to the horizontal stop bar 149, the compressed air, gas, or liquid will provide a lifting force which causes the cylinders and the bar 132 to rise in the direction A. This lifting force can assist the scissor lift 163 to handle greater loads, to speed lift rate, and/or to stead lifting.

When the scissoring mechanism and scissor lift is moved to the lowered position in the direction B, the shafts 298, 300 will be correspondingly received in the cylinders 294, 296 and the air, gas, or liquid in the cylinders will be compressed.

Figure 15:
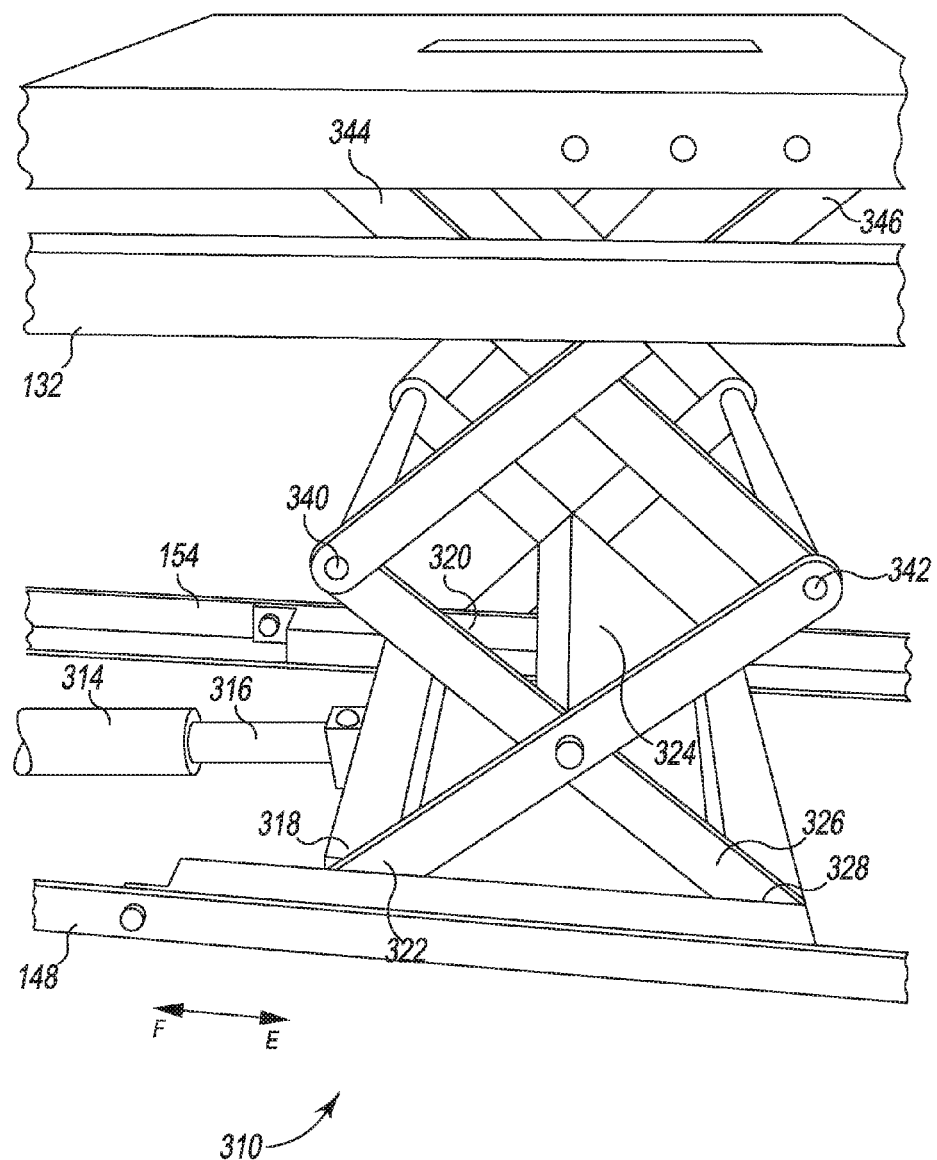
FIG. 15 is a rear view of a second embodiment scissoring mechanism.
Figure 16:
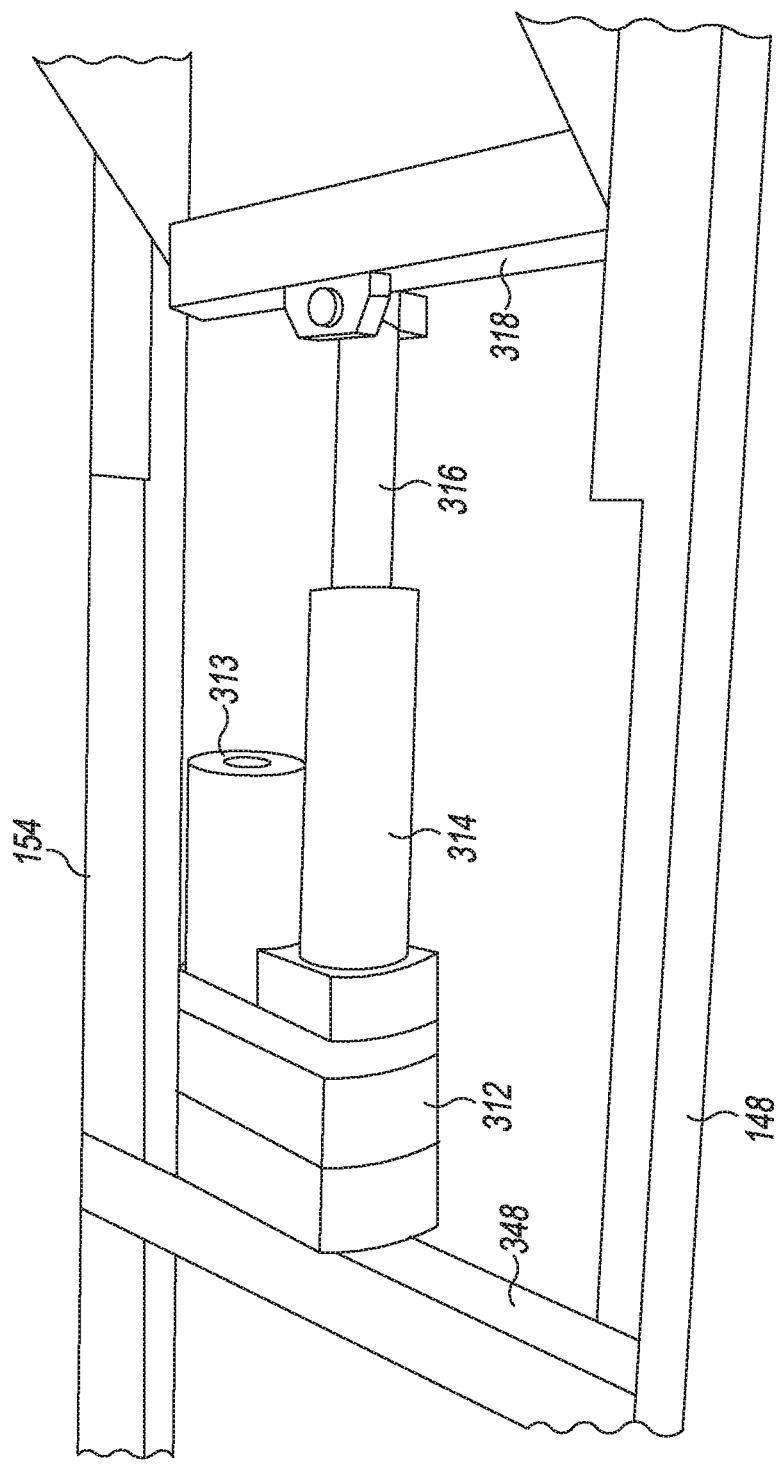
FIG. 16 is a perspective rear view of a linear actuator of the scissoring mechanism of FIG. 15.

FIGS. 15 and 16 show a second embodiment scissoring mechanism 310. The scissoring mechanism 310 is identical to scissoring mechanism 216, except as described below and shown in FIGS. 15 and 16. The scissor lift 163 is replaced by a linear actuator 312. The linear actuator comprises a cylinder 314 and a rod 316. The rod is fixed to a sliding crossbar 318.

In some embodiments, the linear actuator 312 is a screw type linear actuators, where a screw (not shown) is driven by a motor, such as an electric motor 313. The screw pushes and pulls the rod 316 depending on the direction of rotation of the screw by the motor. In some embodiments, the linear actuator 312 is a hydraulic cylinder driven and withdrawn by hydraulic pressure created by a hydraulic pump (not shown) acting on hydraulic fluid.

The first rear scissor bar 320 is connected at a bottom to the sliding crossbar 318. The second front scissor bar 322 is connected at a bottom to the sliding crossbar 318. The first cross plate portion 232 and the second cross plate portion 234 are replaced with a continuous cross plate 324.

In operation, when the linear actuator causes the rod 316 to extend in the direction E, the scissoring mechanism rises. The bottom end of the second front scissor bar 322 is moved in the direction E toward the bottom 328 of a first front scissor bar 326. This causes connection points 340, 342 to pivot, move toward each other, and rise. This causes the top end of a fourth front scissor bar 344 to slide in the direction E toward a third front scissor bar 345. This causes the platform 140 to rise. The platform 140 is connected to bars 130, 132 as described regarding scissoring mechanism 216. Therefore as the platform rises, the upper frame 74 rises.

When the linear actuator causes the rod 316 to retract in the direction F, the scissoring mechanism lowers. The bottom end of the second front scissor bar 322 is moved in the direction F away from the bottom 328 of a first front scissor bar 326. This causes connection points 340, 342 to pivot, move away from each other, and lower. This causes the top end of a fourth front scissor bar 344 to slide in the direction F away from a third front scissor bar 345. This causes the platform 140 to lower. The upper frame 74 lowers and the platform lowers.

The linear actuator 312 is attached to a cross-member support bar 348. Cross-member support bar 348 is attached at opposite ends to bars 148, 154. Bar 348 provides stationary support for the linear actuator. The linear actuator 312 may be a screw type, wheel and axle type, a cam type, hydraulic, pneumatic, or other linear actuator.

Figure 17:
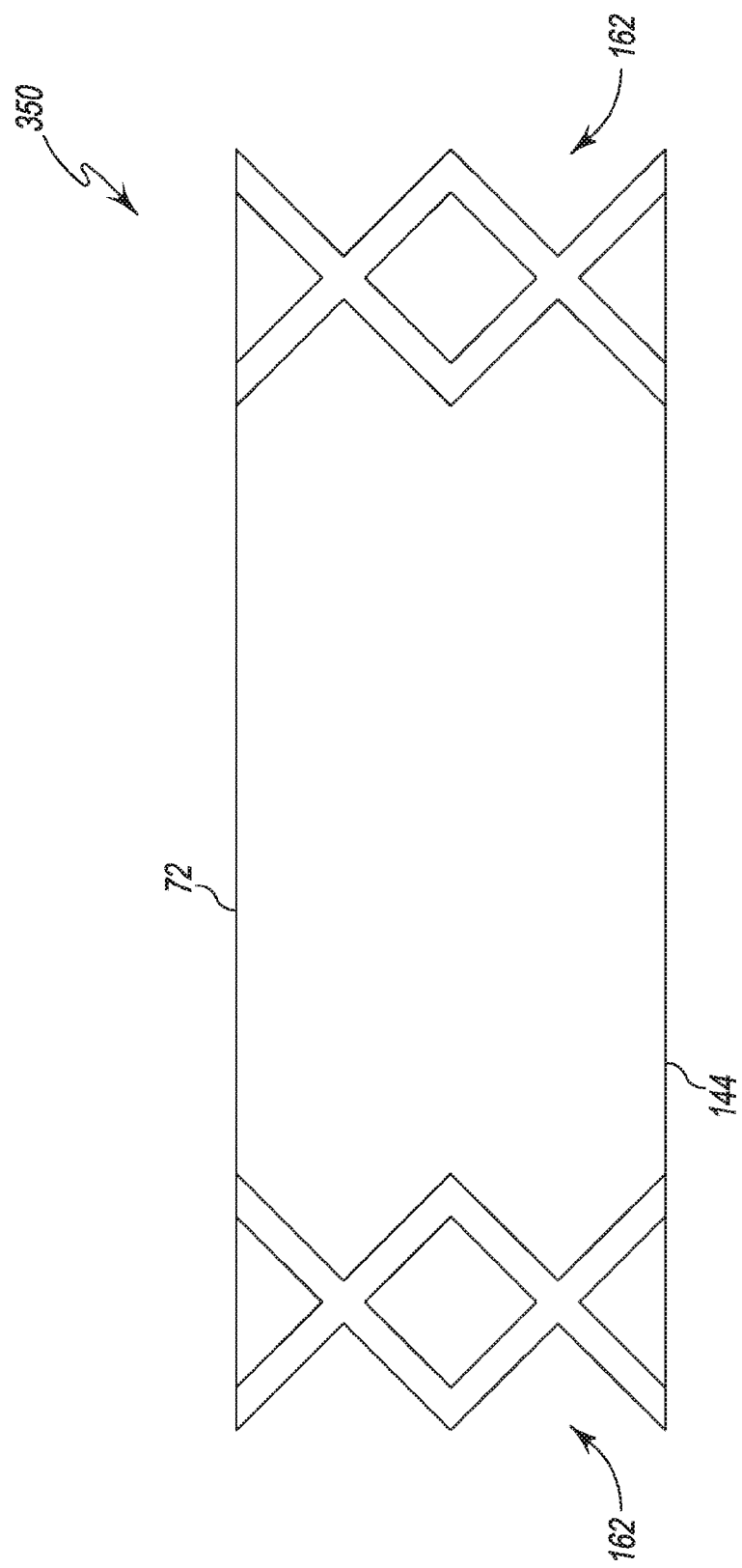
FIG. 17 is a front view of a third embodiment lift mechanism.

FIG. 17 shows a third embodiment lift mechanism 350. The lift mechanism 350 comprises the upper frame 72 and the lower frame 144 of scissor mechanism 162. However, instead of providing the centrally located scissor mechanism 162, scissor lift 163, and drive mechanism 218, two scissor mechanisms 162, two scissor lifts 163, and two drive mechanisms 218 are provided, one at each longitudinal end of the upper frame 72 and the lower frame 144. The drive mechanisms are operated in sync from a central switch, such as switch 60, or controller so that the two scissor mechanisms 162 and the two scissor lifts 163 move up and down in sync.

In another embodiment, linear actuators, such as described regarding FIGS. 15 and 16, are provided at each of the two scissor mechanisms 162 of FIG. 17.

In a fourth embodiment, the interior container 41 may comprise multiple separate interior containers, such as a left side interior container 352 and a right side interior container 354 shown in FIG. 18. In some embodiments, each container 352, 354 may comprise left and right side drawers, such as those shown with interior container 41. In some embodiments, each container 352, 354 comprises front sliding drawers, such as those shown with interior container 51. In some embodiments, each container comprises a combination of front sliding and right and/or left side sliding drawers, such as shown with interior container 61. In some embodiments, the containers 352, 354 do not have drawers but instead have a top lid that opens to provide access to the internal space of the containers.

In some embodiments, the exterior container 22 is any conventional pickup truck bed toolbox.

In some embodiments, the lift mechanism 131 and interior container 41 are provided separate from the exterior container so that it may be installed in a conventional truck bed toolbox.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A storage device for a truck bed, comprising:
    an exterior housing comprising sidewalls, a lid, a left wing, and a right wing, the left wing is configured to rest on a left side rail of the truck bed and the right wing is configured to rest on a right side rail of the truck bed so that the exterior housing extends across the truck bed adjacent a truck cab, the exterior housing providing an enclosed space when the lid is in a closed position;
    an interior container;
    a scissor lift mechanism located within the exterior housing and operatively connected to the interior container, the scissor lift mechanism comprises a raised position and a lowered position, the interior container is within the exterior housing when the scissor lift mechanism is in the lowered position, the interior container is at least partially located outside the exterior housing when the scissor lift mechanism is in the raised position, the scissor lift mechanism maintains the interior container in a horizontal orientation when the scissor lift mechanism is in the raised position and when the scissor lift mechanism is in the lowered position;
    a drive mechanism operatively connected to the scissor lift mechanism to drive the scissor lift mechanism between the lowered position and the raised position.

2. The storage device of claim 1, wherein the scissor lift mechanism maintains the interior container in the horizontal orientation when moving between the raised position and the lowered position.

3. The storage device of claim 1, wherein the interior container comprises a bottom floor and the scissor lift mechanism maintains the bottom floor in a horizontal orientation when moving between the raised position and the lowered position.

4. The storage device of claim 1, wherein the interior container comprises a left side, a right side, and a plurality of drawers, at least one of the plurality of drawers is located on the left side and at least one of the plurality of drawers is located on the right side.

5. The storage device of claim 1, wherein the interior container comprises a left side, a right side, a front face and a plurality of drawers, at least one of the plurality of drawers is located on the front face.

6. The storage device of claim 1, wherein the interior container comprises a left side, a right side, a front face and a plurality of drawers, at least one of the plurality of drawers is located on each of the front face, the left side, and the right side.

7. The storage device of claim 1, wherein the drive mechanism comprises a motor operatively connected to the scissor lift mechanism through a gearing.

8. The storage device of claim 1, wherein the drive mechanism comprises a linear actuator connected to the scissor lift mechanism.

9. The storage device of claim 1, wherein the scissor lift mechanism comprises a scissor lift and a scissoring mechanism, the drive mechanism is operatively connected to the scissor lift to drive the scissor lift between a raised position and a lowered position, the scissor lift is connected to the scissoring mechanism to move the scissoring mechanism between a raised position and a lowered position, the scissoring mechanism is operatively connected to the interior container.

10. The storage device of claim 9, wherein the scissor lift mechanism comprises a upper frame and a lower frame, the upper frame is attached to a upper end of the scissoring mechanism, the lower frame is attached to a lower end of the scissoring mechanism, the interior container is attached to the upper frame, the lower frame is supported on or above a floor of the exterior housing, the upper frame and the lower frame comprise a rectangular shape.

11. The storage device of claim 9, wherein the interior container comprises a plurality of interior containers each operatively connected to the scissor lift mechanism.

12. The storage device of claim 1, wherein,
the scissor lift mechanism maintains the interior container in the horizontal orientation when moving between the raised position and the lowered position;
the interior container comprises a left side, a right side, and a plurality of drawers, at least one of the plurality of drawers is located on the left side and at least one of the plurality of drawers is located on the right side;
the drive mechanism comprises an electric motor;
the scissor lift mechanism comprises a scissor lift and a scissoring mechanism, the electric motor is connected through a gearing to the scissor lift to drive the scissor lift between a raised position and a lowered position, the scissor lift is connected to the scissoring mechanism through a pivot pin connection to move the scissoring mechanism between a raised position and a lowered position;
the scissor lift mechanism comprises an upper frame and a lower frame, the upper frame is attached to an upper end of the scissoring mechanism, the lower frame is attached to a lower end of the scissoring mechanism, the interior container rests on and is attached to the upper frame, the lower frame is supported on or above a floor of the exterior housing.

13. The storage device of claim 12, comprising a left clamp and a right clamp, the left clamp extending from the left wing and configured to extend under the left side rail of the truck bed, the right clamp extending from the right wing and configured to extend under the right side rail of the truck bed.

14. The storage device of claim 1, wherein,
the scissor lift mechanism maintains the interior container in a same orientation when moving between the raised position and the lowered position;
the interior container comprises a left side, a right side, and a plurality of drawers, at least one of the plurality of drawers is located on the left side and at least one of the plurality of drawers is located on the right side;
the drive mechanism comprises a linear actuator;
the scissor lift mechanism comprises a scissoring mechanism, the linear actuator is connected to the scissoring mechanism to drive the scissoring mechanism between a raised position and a lowered position,
the scissor lift mechanism comprises a upper frame and a lower frame, the upper frame is attached to an upper end of the scissoring mechanism, the lower frame is attached to a lower end of the scissoring mechanism, the interior container rests on and is attached to the upper frame, the lower frame is supported on or above a floor of the exterior housing.

15. A tool box for a truck bed, comprising:
an exterior housing comprising sidewalls, a lid, the exterior housing configured to extends across the truck bed adjacent a truck cab, the exterior housing providing an enclosed space when the lid is in a closed position;
an interior container;
a scissor lift mechanism located within the exterior housing and operatively connected to the interior container, the scissor lift mechanism comprises a raised position and a lowered position, the interior container is within the exterior housing when the scissor lift mechanism is in the lowered position, the interior container is at least partially located outside the exterior housing when the scissor lift mechanism is in the raised position, the scissor lift mechanism maintains the interior container in the same orientation when in the raised position, when in the lowered position, and when moving between the raised position and the lowered position;
a drive mechanism operatively connected to the scissor lift mechanism to drive the scissor lift mechanism between the lowered position and the raised position.

16. The tool box of claim 15, wherein the interior container comprises a left side, a right side, and a plurality of drawers, at least one of the plurality of drawers is located on the left side and at least one of the plurality of drawers is located on the right side.

17. The tool box of claim 15, wherein the drive mechanism comprises a motor operatively connected to the scissor lift mechanism through a gearing.

18. The tool box of claim 15, wherein the drive mechanism comprises a linear actuator connected to the scissor lift mechanism.

19. The tool box of claim 15, wherein the scissor lift mechanism comprises a scissor lift and a scissoring mechanism, the drive mechanism is operatively connected to the scissor lift to drive the scissor lift between a raised position and a lowered position, the scissor lift is connected to the scissoring mechanism to move the scissoring mechanism between a raised and a lowered position, the scissoring mechanism is operatively connected to the interior container.

\* \* \* \* \*